(12) United States Patent
Shin et al.

(10) Patent No.: US 11,182,905 B2
(45) Date of Patent: Nov. 23, 2021

(54) ALGORITHMIC APPROACH TO FINDING CORRESPONDENCE BETWEEN GRAPHICAL ELEMENTS

(71) Applicant: Adobe Inc., San Jose, CA (US)

(72) Inventors: Hijung Shin, Arlington, MA (US); Holger Winnemoeller, Seattle, WA (US); Wilmot Li, Seattle, WA (US)

(73) Assignee: ADOBE INC., San Jose, CA (US)

( * ) Notice: Subject to any disclaimer, the term of this patent is extended or adjusted under 35 U.S.C. 154(b) by 15 days.

(21) Appl. No.: 16/825,583

(22) Filed: Mar. 20, 2020

(65) Prior Publication Data

US 2021/0295527 A1 Sep. 23, 2021

(51) Int. Cl.
*G06T 7/162* (2017.01)
*G06T 7/181* (2017.01)
*G06T 7/12* (2017.01)
*G06F 8/38* (2018.01)

(52) U.S. Cl.
CPC ............... *G06T 7/162* (2017.01); *G06T 7/12* (2017.01); *G06T 7/181* (2017.01); *G06F 8/38* (2013.01)

(58) Field of Classification Search
CPC . G06T 7/162; G06T 7/181; G06T 7/12; G06F 8/38
See application file for complete search history.

(56) References Cited

U.S. PATENT DOCUMENTS 10,860,295 B1 * 12/2020 Ketireddy ................. G06F 8/34
2018/0357801 A1 * 12/2018 Rasheed ................. G06T 11/60

OTHER PUBLICATIONS

Fisher, Matthew et al., "Characterizing structural relationships in scenes using graph kernels", 2011, ACM Transactions on graphics, Article No. 34, pp. 1-11 (Year: 2011).*
Edge, Darren , et al., "Mixed-Initiative Approaches to Global Editing in Slideware", In: Proceedings of the 33rd Annual ACM Conference on Human Factors in Computing Systems. CHI'15. Seoul, Republic of Korea: ACM, 2015, pp. 3503-3512 isbn: 978-1-4503-3145-6. doi:10.1145/2702123.2702551 url: http://doi.acm.org/10.1145/2702123.2702551., 2015.
Fisher, Matthew , et al., "Characterizing structural relationships in scenes using graph kernels", In: ACM transactions on graphics (TOG). vol. 30. 4. ACM. 2011, p. 34., 2011.
Guerrero, Paul , "PATEX: Exploring Pattern Variations", In: ACM Trans. Graph. 35.4 (2016), 48:1-48:13. issn: 0730-0301 doi: 10.1145/2897824.2925950., 2016.

(Continued)

*Primary Examiner* — Chan S Park
*Assistant Examiner* — Daniel C Chang
(74) *Attorney, Agent, or Firm* — Keller Jolley Preece

(57) ABSTRACT

Introduced here are computer programs and associated computer-implemented techniques for finding the correspondence between sets of graphical elements that share a similar structure. In contrast to conventional approaches, this approach can leverage the similar structure to discover how two sets of graphical elements are related to one another without the relationship needing to be explicitly specified. To accomplish this, a graphics editing platform can employ one or more algorithms designed to encode the structure of graphical elements using a directed graph and then compute element-to-element correspondence between different sets of graphical elements that share a similar structure.

20 Claims, 18 Drawing Sheets
(11 of 18 Drawing Sheet(s) Filed in Color)

(56) References Cited

OTHER PUBLICATIONS

Kurlander, David, "Watch What I Do", In: ed. by Allen Cypher et al. Cambridge, MA, USA: MIT Press, 1993. Chap. Chimera: Example-based Graphical Editing, pp. 271-290. isbn: 0-262-03213-9. url: http://dl.acm.org/citation.cfm?id=168080.168118., 1993.

Lun, Zhaoliang, et al., "Learning to group discrete graphical patterns", In: ACM Transactions on Graphics (TOG) 36.6 (2017), p. 225., 2017.

Nan, Liangliang, et al., "Conjoining gestalt rules for abstraction of architectural drawings", vol. 30. 6. ACM, 2011., 2011.

ŠT'Ava, Ondrej, et al., "Inverse procedural modeling by automatic generation of L-systems", In: Computer Graphics Forum. Vol. 29. 2. Wiley Online Library. 2010, pp. 665-674., 2010.

Su, Sara L., et al., "QuickSelect: History-Based Selection Expansion", In: Proceedings of the 35th Graphics Interface Conference. 2009, pp. 215-221., 2009.

Szeliski, Richard, et al., "Image alignment and stitching: A tutorial", In: Foundations and Trends® in Computer Graphics and Vision 2.1 (2007), pp. 1-104., 2007.

Van Kaick, Oliver, et al., "A survey on shape correspondence", In: Computer Graphics Forum.vol. 30. 6. Wiley Online Library. 2011, pp. 1681-1707., 2011.

Wu, Fuzhang, et al., "Inverse proceduralmodeling of facade layouts", In: arXiv preprint arXiv:1308.0419 (2013)., 2013.

Xu, Pengfei, et al., "GACA: Group-aware command-based arrangement of graphic elements", In: Proceedings of the 33rd Annual ACM Conference on Human Factors in Computing Systems. ACM. 2015, pp. 2787-2795., 2015.

\* cited by examiner

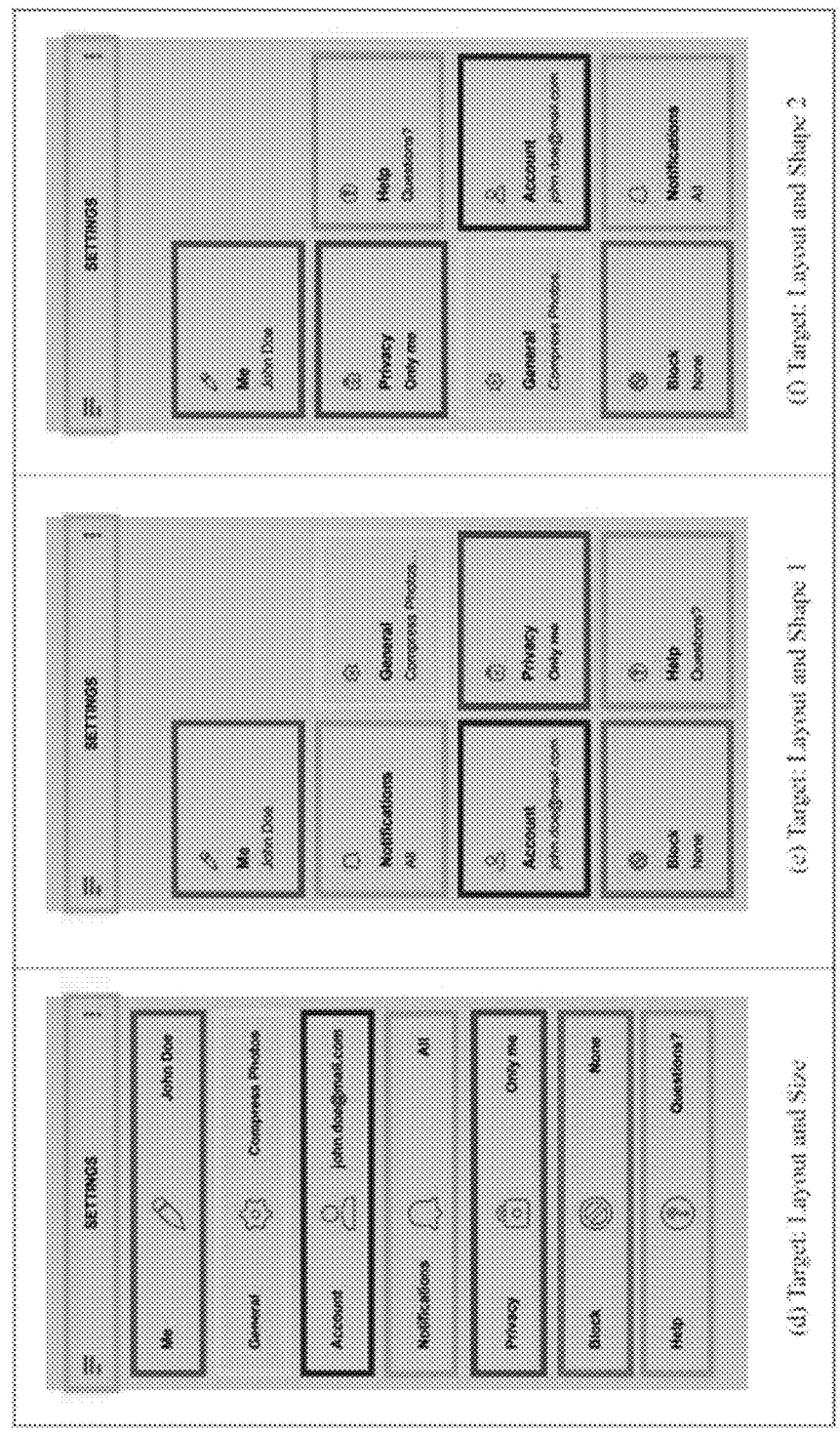
FIGURE 8, CONT.

1300

1301

Classify all nodes in a first directed graph as either confident matches or uncertain matches

1302

Recompute the pairwise similarity scores for nodes classified as confident matches with updated node kernel parameters

1303

Recompute the pairwise similarity scores for nodes classified as uncertain matches with the original node kernel parameters

FIGURE 13

ALGORITHMIC APPROACH TO FINDING CORRESPONDENCE BETWEEN GRAPHICAL ELEMENTS

TECHNICAL FIELD

Various embodiments concern computer programs and associated computer-implemented techniques for finding the correspondence between sets of graphical elements that share a similar structure.

BACKGROUND

The process of designing visual compositions (also referred to as "graphics" or "graphical designs") for the purpose of conveying information to an audience may be referred to as "graphic design." Designers may combine graphical elements to form a visual composition that is representative of an idea.

Many designers employ a hybrid process that combines traditional and computer-assisted technologies when creating visual compositions. For instance, hand-rendered layouts may be used to get approval to execute an idea, and then the polished visual composition may be produced via a software program. The type of software program (and thus the overall approach) may vary based on whether the visual composition is a raster-based graphic (or simply "raster graphic") or a vector-based graphic (or simply "vector graphic").

Raster graphics are bitmaps in which each collection of pixels represents an image. At a high level, a raster graphic is a grid of pixels, and each pixel is a specific hue or shade. Vector graphics, meanwhile, are not made up of a grid of pixels. Instead, vector graphics are defined in terms of two-dimensional points connected by lines to form polygons and other shapes, and each point has a definite position on the x- and y-axis of the work plane.

BRIEF DESCRIPTION OF THE DRAWINGS

This patent or application contains at least one drawing executed in color. Copies of this patent or application publication with color drawings will be provided by the Office upon request and payment of the necessary fee.

FIG. 13 depicts a flow diagram of a process for distinguishing between confident matches and less-confident matches (also referred to as "uncertain matches") based on the similarity scores.

Figure 1A:
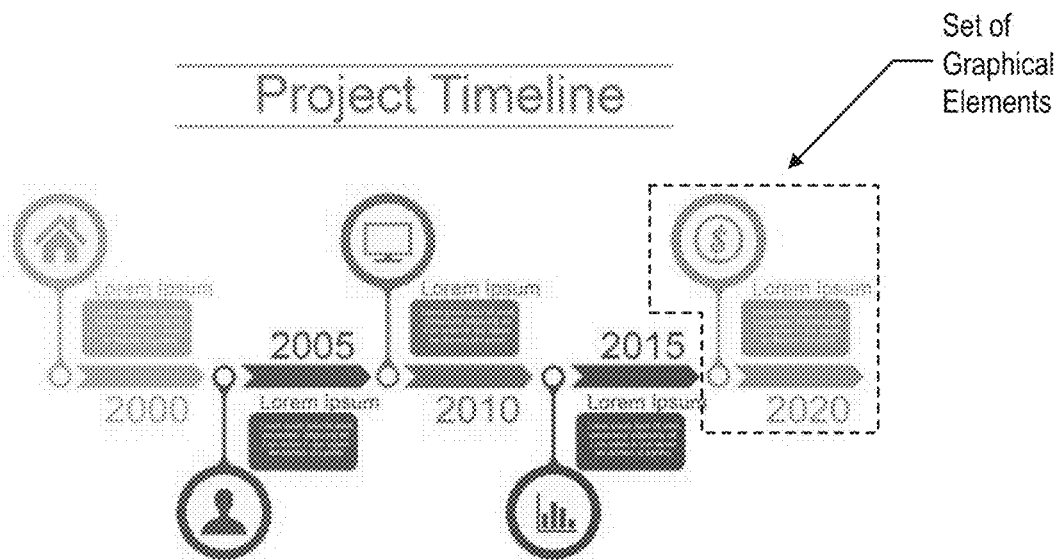
FIGS. 1A-C depict examples of graphics that include multiple sets of graphical elements with a similar structure.

Various features of the technologies described herein will become more apparent to those skilled in the art from a study of the Detailed Description in conjunction with the drawings. Embodiments are illustrated by way of example and not limitation in the drawings, in which like references may indicate similar elements. While the drawings depict various embodiments for the purpose of illustration, those skilled in the art will recognize that alternative embodiments may be employed without departing from the principles of the technologies. Accordingly, while specific embodiments are shown in the drawings, the technology is amenable to various modifications.

DETAILED DESCRIPTION

Figure 1B:
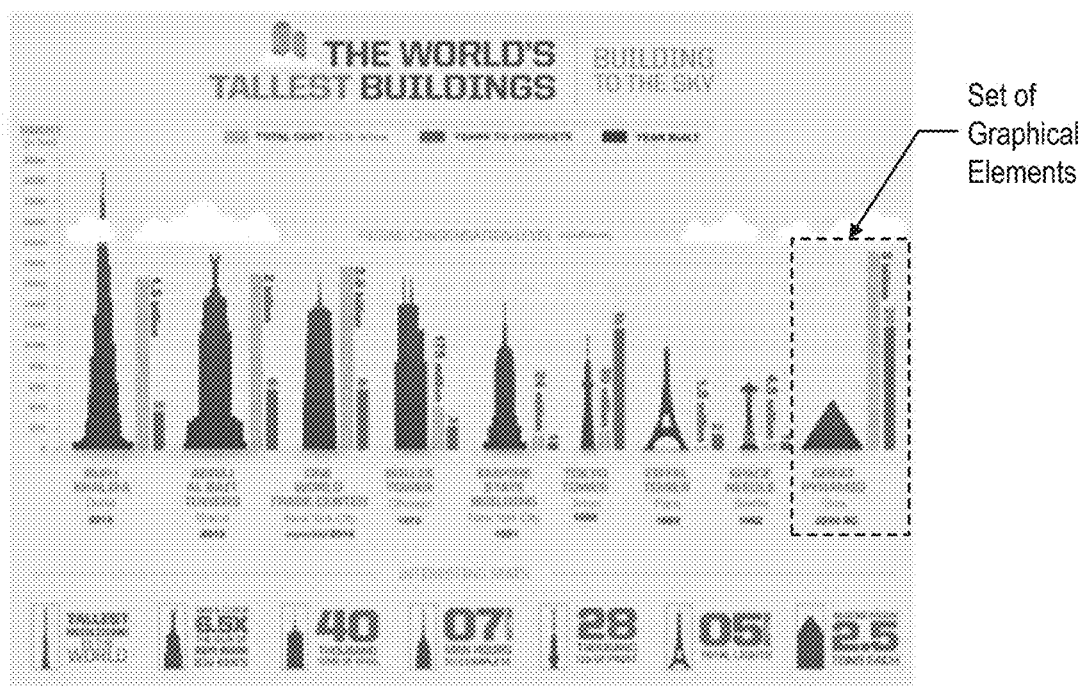
Figure 1C:
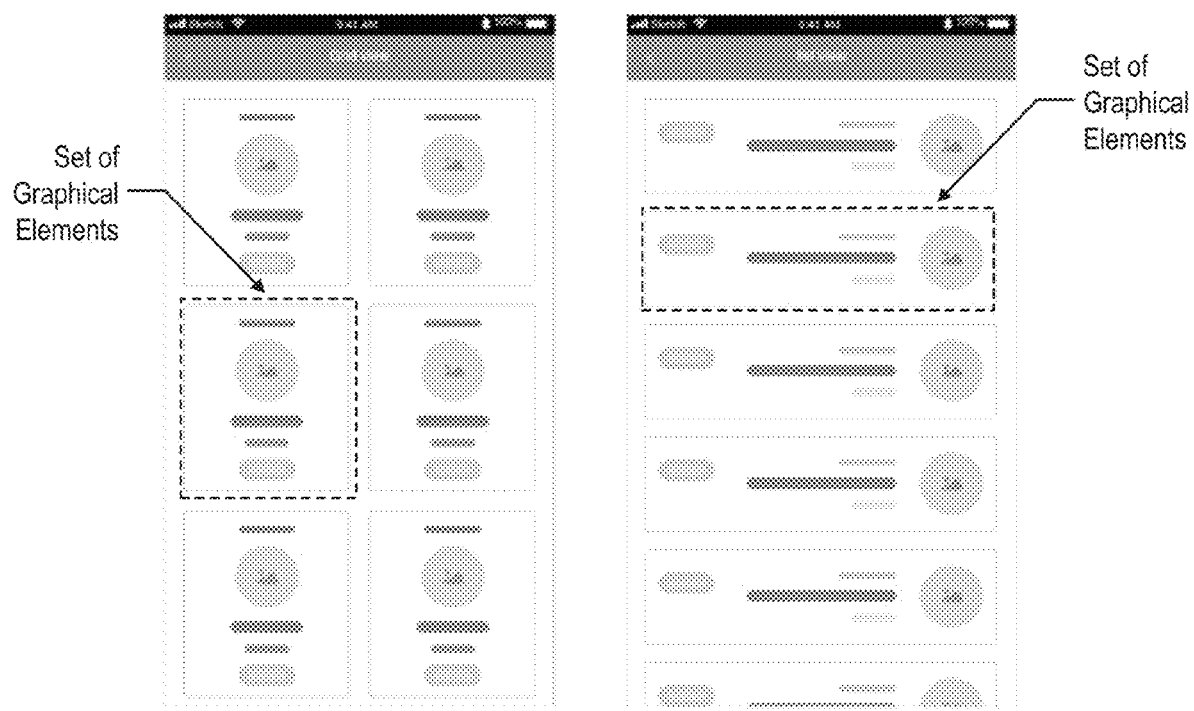

Designers may combine graphical elements to form visual compositions (also referred to as "graphical designs" or "graphics") that are representative of ideas. Graphics (e.g., charts, diagrams, and infographics) may be created for inclusion in, for example, user interfaces (UIs), publications, or advertisements. In some instances, graphics include multiple sets of graphical elements that share a similar structure. In FIG. 1A, for example, each year is associated with a different set of graphical elements. Each set of graphical elements includes the same types of graphical elements (e.g., a text box with the year, an arrow element, and a bubble element containing an icon) arranged in a similar layout but with variations in style. FIGS. 1B-C depict additional examples of graphics that include multiple sets of graphical elements with a similar structure. In FIG. 1B, each set of graphical elements includes a silhouette of a building, a series of vertical bars conveying information about the building, and text annotations beneath the silhouette. In FIG. 1C, each set of graphical elements includes an icon for a menu item and related information positioned alongside the icon.

Figure 2A:
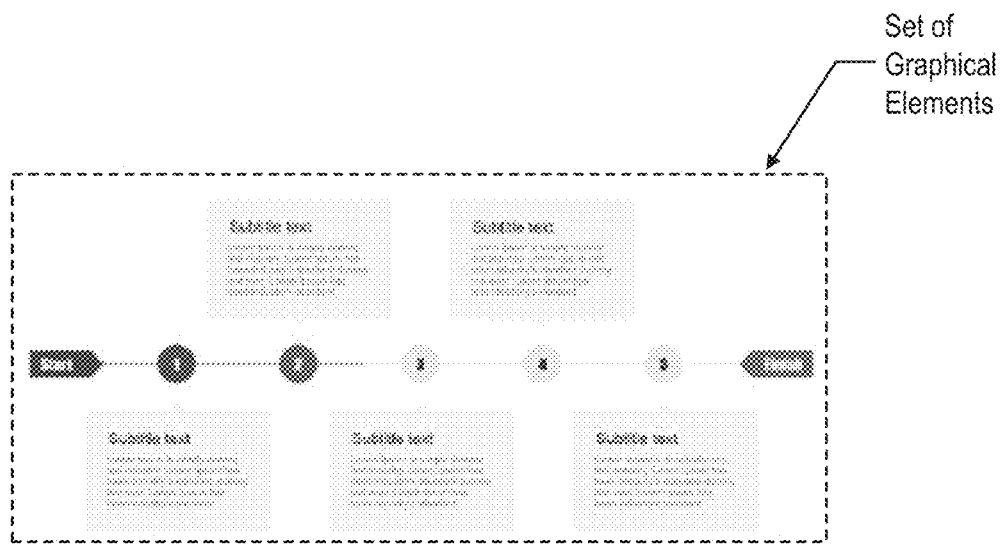
FIGS. 2A-C illustrate how sets of graphical elements that share a similar structure may exist within multiple graphics.
Figure 2B:
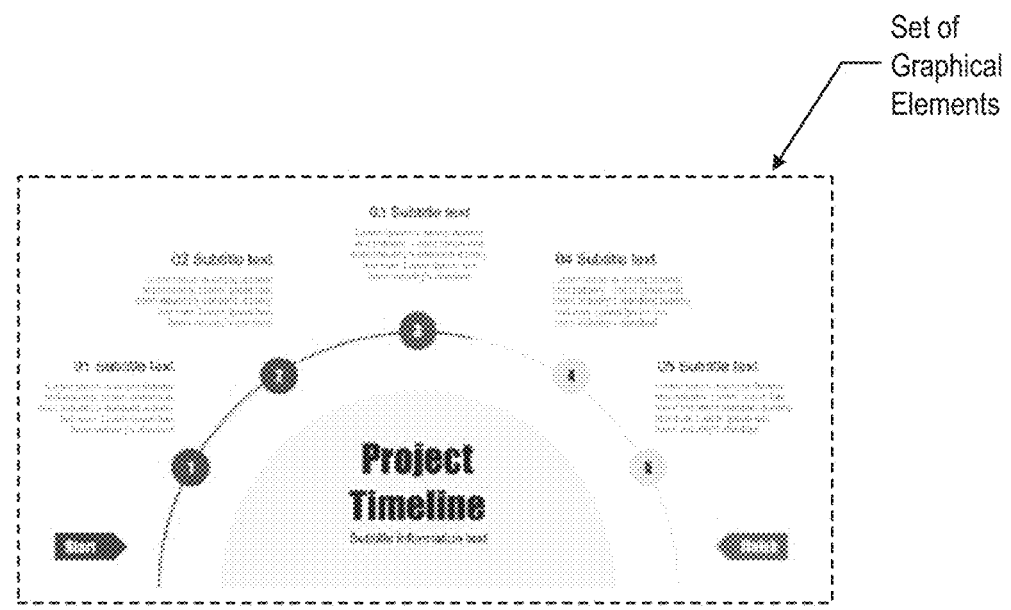
Figure 2C:
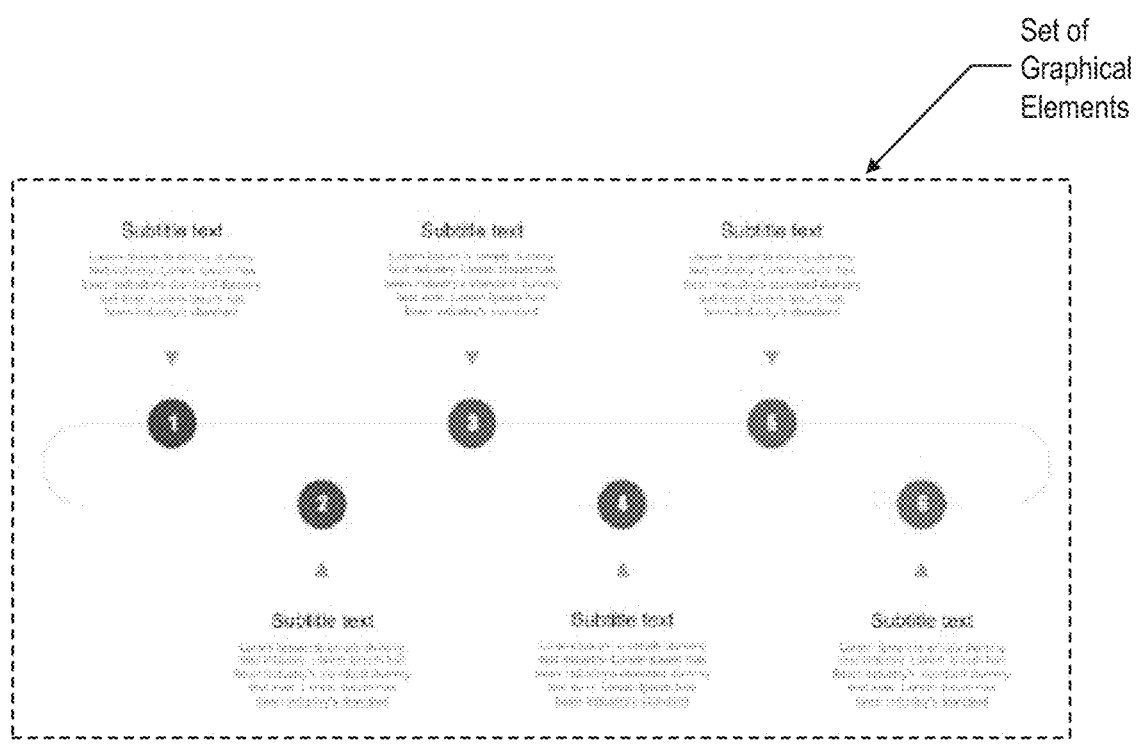

As shown in FIGS. 1A-C, sets of graphical elements that share a similar structure may exist within a single graphic. Sets of graphical elements that share a similar structure may also exist within multiple graphics as shown in FIGS. 2A-C. In FIGS. 2A-C, the timelines share a similar structure despite varying in style.

Information about how sets of graphical elements that share a similar structure correspond to one another can be extremely useful. For example, information on correspondence may be useful in comparing two graphics. As another example, information on correspondence may be useful in transferring style attributes or editing operations from one graphic to another graphic. However, explicitly specifying such information is a tedious, error-prone task that requires significant long-term planning (e.g., to know which sets of graphical elements are likely to be reused).

Several approaches have been developed in an attempt to algorithmically understand the underlying structure of graphics to facilitate authoring, editing, etc. Examples of such approaches include techniques for computing perceptual groupings of discrete graphical patterns, techniques for encoding the structure of a graphical pattern to create design variations, and techniques for decomposing a two-dimensional layout into multiple one-dimensional groups to perform group-aware optimization of layout arrangement.

An alternative to these algorithmic approaches is mixed-initiative approaches that take advantage of user input (e.g., interactions) to infer structure. One example of such an approach involves using the history of document edits to extract implicit groupings of graphical elements. Another example of such an approach involves generalizing a macro by making inferences based on heuristics such as the hierarchical and geometric relationships between graphical elements.

However, these approaches—both purely algorithmic and mixed-initiative—fail to address a key issue in graphic design, namely, how can correspondence be determined in a consistent, accurate manner.

Introduced here, therefore, are approaches to finding the correspondence between sets of graphical elements that share a similar structure. In contrast to the above-mentioned conventional approaches, these approaches can leverage the similar structure to discover how two sets of graphical elements are related to one another without the relationship needing to be explicitly specified. To accomplish this, a graphics editing platform (or simply "editing platform") can employ one or more algorithms designed to encode the structure of graphical elements using a directed graph and then compute element-to-element correspondence between different sets of graphical elements that share a similar structure.

Imagine, for instance, that an individual wishes to define a macro of editing operations on one set of graphical elements (also referred to as the "source set of graphical elements") through the editing platform and then repeatedly apply the macro to one or more other sets of graphical elements (also referred to as the "target sets of graphical elements") with a similar structure. As noted above, these target sets of graphical elements may be located within the same graphic as the source set of graphical elements or a different graphic. Traditionally, the individual would have needed to explicitly specify the relationship between the source set of graphical elements and each target set of graphical elements. Here, however, the editing platform can leverage information inferred about each graphical element in the source set to generalize the macro, and thus infer which editing operation applies to which graphical element in each target set.

Although not required, implementations are described below in the context of computer-executable instructions, such as routines executed by a general-purpose computing device such as a networked computer server, personal computer, or mobile device. Indeed, the term "computing device" is generally used interchangeably with computer servers, personal computers, mobile phones, and the like.

While aspects of the technology, such as certain functions or modules, may be described as being performed exclusively or primarily on a single computing device, some implementations are practices in distributed environments where functions/modules are shared among multiple computing devices that are linked through a network, such as a local area network (LAN), wide area network (WAN), or the Internet. In a distributed computing environment, modules can be located in both local and remote memory storage devices.

Aspects of the technology can be stored or distributed on tangible computer-readable media, including magnetically or optically readable computer discs, hardwired or preprogrammed chips (e.g., EEPROM semiconductor chips), nanotechnology memory, biological memory, or other non-transitory data storage media. In some embodiments, computer-executable instructions, data structures, and other information can be distributed over the Internet (or another network) on a propagated signal on a propagation medium (e.g., an electromagnetic wave or a sound wave) over a period of time, or these materials can be provided on an analog or digital network (e.g., packet switched, circuit switched, or other scheme).

In one example, algorithms designed to compute the correspondence between sets of graphical elements may be executed by an editing platform through which an individual may view, create, and modify vector graphics comprised of vector-based graphical elements. The editing platform could be embodied as a software program (e.g., a mobile application or a desktop application) that offers an end-to-end solution for vector-based graphic design. In particular, the editing platform may prompt a processor to execute computer-executable instructions for obtaining two sets of graphical elements from a memory, constructing a directed graph for each set of graphical elements, and then determining an element-to-element correspondence relationship (or simply "correspondence relationship") between the two sets of graphical elements based on a comparison of the directed graphs. As further discussed below, the correspondence relationship can account for differences in orientation, position, size, color, or number of the graphical elements in the two sets.

Overview of Editing Platform

Figure 3A:
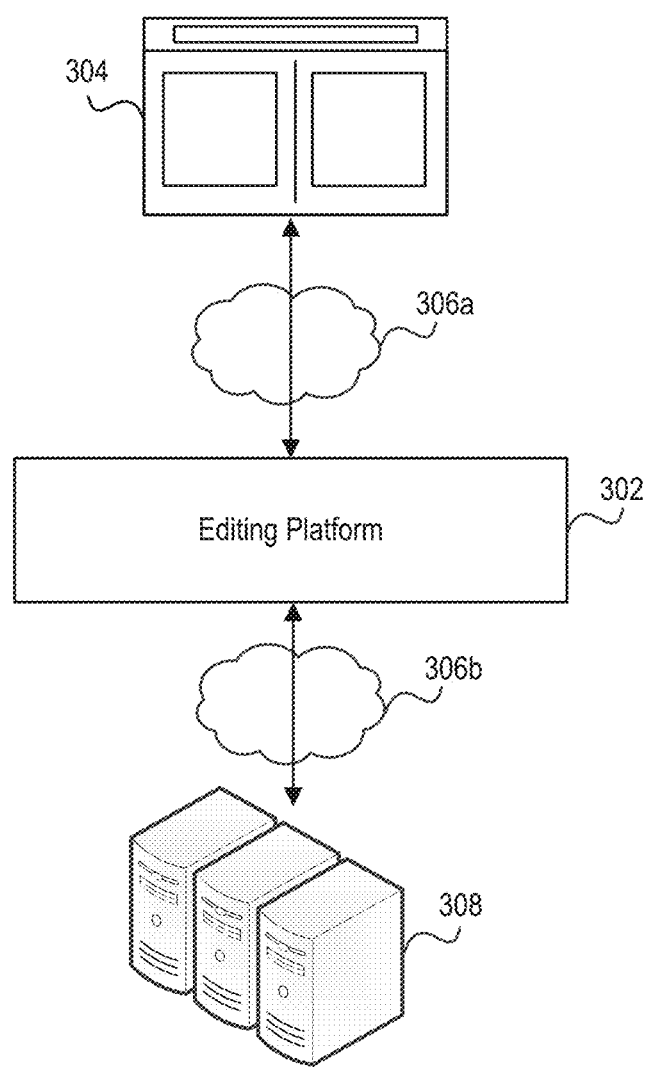
FIG. 3A illustrates a network environment that includes an editing platform able to execute instructions for computing the correspondence between sets of graphical elements.

FIG. 3A illustrates a network environment 300 that includes an editing platform 302 able to execute instructions for computing the correspondence between sets of graphical elements. As further discussed below, the editing platform 302 may be comprised of a series of modules operable to construct directed graphs for two sets of graphical elements, compute similarity for each pair of nodes in the these directed graphs, and determine correspondence between the two sets of graphical elements based on the similarity. The term "module" refers broadly to software components, firmware components, and/or hardware components. Accordingly, aspects of the editing platform 302 could be implemented in software, firmware, and/or hardware.

As shown in FIG. 3A, individuals can interface with the editing platform 302 via an interface 304. An example of an editing platform 302 is a vector graphics editor through which individuals can view, create, or manipulate vector graphs. Another example of an editing platform 302 is a raster graphics editor through which individuals can view, create, or manipulate raster graphics. The editing platform 302 may be responsible for creating the interfaces through which these actions can be specified. Similarly, the editing platform 302 may be responsible for creating the interfaces through which an individual can identify/define sets of graphical elements, specify preferences, etc.

In some embodiments, the sets of graphical elements to be examined are created using the editing platform 302. In other embodiments, the sets of graphical elements to be examined are uploaded to the editing platform 302. For example, an individual may access the editing platform 302 and then select, via an interface generated by the editing platform 302, two sets of graphical elements from a memory for examination.

As noted above, the editing platform 302 may reside in a network environment 300. Thus, the editing platform 302 may be connected to one or more networks 306a-b. The network(s) 306a-b can include personal area networks (PANs), local area networks (LANs), wide area networks (WANs), metropolitan area networks (MANs), cellular networks, the Internet, etc. Additionally or alternatively, the editing platform 302 can be communicatively coupled to computing device(s) over a short-range communication protocol, such as Bluetooth® or near-field communication (NFC).

The interface 304 is preferably accessible via a web browser, desktop application, mobile application, and/or over-the-top (OTT) application. Accordingly, the interface 304 may be viewed on a personal computer, tablet computer, mobile phone, game console, music player, wearable electronic device (e.g., a watch or a fitness accessory), network-connected ("smart") electronic device, (e.g., a television or a home assistant device), virtual/augmented reality system (e.g., a head-mounted display), or some other electronic device.

Some embodiments of the editing platform 302 are hosted locally. That is, the editing platform 302 may reside on the computing device used to access the interface 304. For example, the editing platform 302 may be embodied as a desktop application executing on a personal computer or a mobile application executing on a mobile phone. Other embodiments of the editing platform 302 are executed by a cloud computing service operated by Amazon Web Services® (AWS), Google Cloud Platform™, Microsoft Azure®, or a similar technology. In such embodiments, the editing platform 302 may reside on a network-accessible server system 308 comprised of one or more computer servers. These computer servers 308 can include different types of data (e.g., graphics), user information (e.g., profiles and credentials), and other assets. Those skilled in the art will recognize that the modules of the editing platform 302 could also be distributed amongst a computing device and a network-accessible server system.

Embodiments are described in the context of network-accessible interfaces. However, those skilled in the art will recognize that the interfaces need not necessarily be accessible via a network. For example, a computing device may execute a self-contained computer program that does not require network access. Instead, the self-contained computer program may download assets (e.g., graphics, matching algorithms, and processing operations) at a single point in time or on a periodic basis (e.g., weekly, daily, or hourly).

Figure 3B:
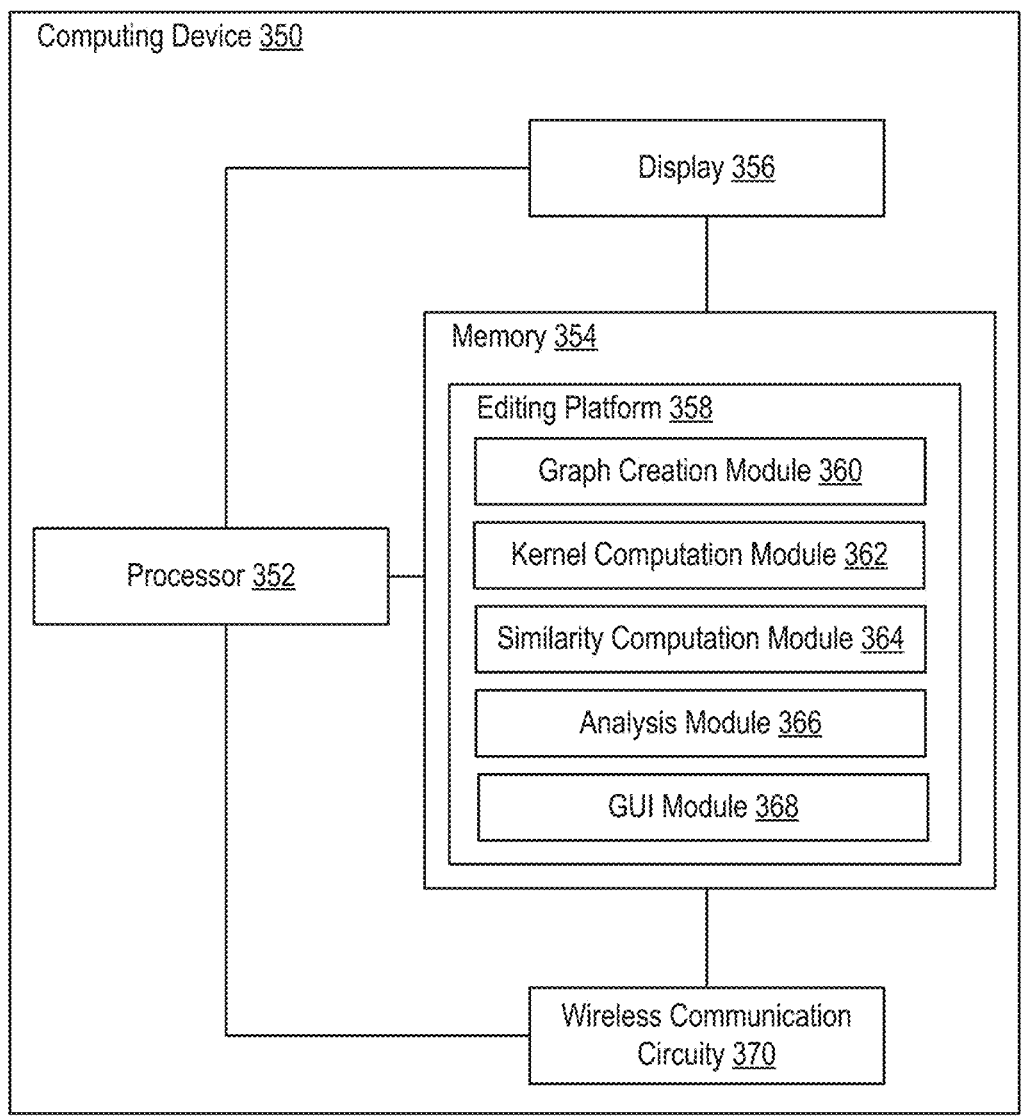
FIG. 3B illustrates an example of a computing device capable of implementing the techniques described herein.

FIG. 3B illustrates an example of a computing device 350 capable of implementing the techniques described herein. Note that the components shown in FIG. 3B are merely illustrative. Components that are well known are not shown for simplicity. Referring to FIG. 3B, the computing device 350 includes a processor 352, a memory 354, and a display 356. The computing device 350 may also include wireless communication circuitry 370 designed to establish wireless communication channels with other computing devices. The processor 352 can have generic characteristics similar to general-purpose processors, or the processor 352 may be an application-specific integrated circuit (ASIC) that provides arithmetic and control functions to the computing device 350. While not shown, the processor 352 may include a dedicated cache memory. The processor 352 can be coupled to all components of the computing device 350, either directly or indirectly, for data communication.

The memory 354 may be comprised of any suitable type of storage device including, for example, a static random-access memory (SRAM), dynamic random-access memory (DRAM), electrically erasable programmable read-only memory (EEPROM), flash memory, latches, and/or registers. In addition to storing instructions which can be executed by the processor 352, the memory 354 can also store data generated by the processor 352 (e.g., when executing the modules of the editing platform 358). Note that the memory 354 is merely an abstract representation of a storage environment. In some embodiments, the memory 354 is comprised of one or more actual memory chips or modules.

The display 356 can be, for example, a touch-enabled display or a non-touch-enabled display—in which case the computing device 350 likely also includes (or is connected to) an input device such as a keyboard.

The wireless communication circuitry 370 can form and/or communicate with a network for data transmission among computing devices, such as personal computers, mobile phones, and computer servers. The wireless communication circuitry 370 can be used for communicating with these computing devices or for connecting to a higher-level network (e.g., a LAN) or the Internet. Examples of wireless communication circuitry 370 include Bluetooth, Z-Wave, ZigBee, and the like. In some embodiments, the connection established by the wireless communication circuitry 370 can be bootstrapped by a near field communication (NFC) connection.

For convenience, the editing platform 358 may be referred to as a computer program that resides within the memory 354. However, as noted above, the editing platform 358 could be comprised of software, firmware, and/or hardware components implemented in, or accessible to, the computing device 350. In accordance with some embodiments of the techniques described herein, the editing platform 358 includes a graph creation module 360, a kernel computation module 362, a similarity computation module 364, and an analysis module 366. Similar to the editing platform 358, each of these modules can be implemented via software, firmware, and/or hardware. As illustrated in FIG. 3B, these modules can be an integral part of the editing platform 358. Alternatively, these modules can be logically separate from the editing platform 358 but operate "alongside" it. Together, these modules may enable the editing platform 358 to establish the correspondence between two sets of graphical elements by computing pairwise element-to-element similarity between those sets of graphical elements.

Initially, the editing platform 358 can obtain two sets of graphical elements for which correspondence is to be established. The two sets of graphical elements could be acquired from the memory 354 upon receiving input indicative of a selection of those sets. Alternatively, the two sets of graphical elements may be automatically identified by the editing platform 358 if both are presently viewable on the display 356. For instance, the two sets of graphical elements may be part of a single graphic viewable on an interface generated by the editing platform 358.

The graph creation module 360 can construct relationship graphs for the two sets of graphical elements obtained by the editing platform 358. In each relationship graph, the nodes may represent the graphical elements in the corresponding set while the edges may represent the relationships between those graphical elements. As further discussed below, the graph creation module 360 may establish a node set and an edge set for each set of graphical elements using the corresponding graph.

The kernel computation module 362 can define a node kernel that compares a pair of nodes in the relationship graphs and then outputs a similarity score. The node kernel can be defined such that it indicates similarity between the pair of graphical elements corresponding to the pair of nodes with respect to at least one metric. Examples of metrics include type, text content, shape, size, aspect ratio, border color, and fill color. Normally, the node kernel will include a separate kernel for each metric that independently produces a separate output as further discussed below. The kernel computation module 362 can also define an edge kernel that determines the similarity between a pair of edges that represent the relationship between two graphical elements. Each relationship may be represented as a different edge type so that the kernel computation module 362 can distinguish between more discriminatory relationships and less discriminatory relationships.

Given the outputs produced by the node and edge kernels, the similarity computation module 364 can compare the relationship graphs using a p-th order rooted walk graph kernel. A walk of length p on a directed graph is an ordered set of p nodes in the directed graph along with a set of p−1 edges that connect these nodes together. As further discussed below, the walk graph kernel can compare nodes (s, t) by comparing all walks of length p whose first node is s against all walks of length p whose first node is t.

Given two sets of graphical elements (S, T) to be matched with one another, the editing platform may infer that these sets of graphical elements will be structurally similar. For instance, the similarity computation module 364 may expect that corresponding graphical elements in these sets will share certain features if, for example, an individual has identified these sets as candidates for comparison. Appropriately weighing these features can be difficult, however, so the similarity computation module 364 may employ self-verification to determine a unique set of weights for each element in a set of graphical elements. For each graphical element $s_i \in S$, the similarity computation module 364 can compare each feature with every other graphical element $s_j \in S$ and then compute how similar the feature values are. If the other graphical elements in S have similar feature values as s, the feature may not be considered discriminatory for s. However, if the feature value is unique to s, then the feature can be considered discriminatory for s. Generally, the weights produced by the similarity computation module 364 are defined to lie between 0 (i.e., non-discriminatory) and 1 (i.e., highly discriminatory).

The analysis module 366 may attempt to find a matching graphical element in the first set for every graphical element in the second set based on the similarity scores produced by the similarity computation module 364. Generally, the analysis module 366 accomplishes this by identifying graphical elements in the first set that have a confident match with a graphical element in the second set. A match may be deemed confident if the similarity score for given graphical element in the first set is much greater than the similarity scores of all other graphical elements in the first set (e.g., by a factor of 1.5, 2, 3, etc.). As further discussed below, the similarity scores may be recomputed until all graphical elements in the first set are confidently matches to a single graphical element in the second set, or the similarity scores may be recomputed until a threshold number of iterations is reached. Generally, the analysis module 366 encodes information regarding the correspondence relationship between the two sets of graphical elements in the memory 354.

Other modules could also be included as part of the editing platform 358. For instance, a graphical user interface (GUI) module 368 may be responsible for generating the interfaces through which an individual can interact with the editing platform 358, view outputs produced by the aforementioned modules, etc. As an example, the correspondence relationship defined by the analysis module 366 may be posted by the GUI module 368 to an interface presented on the display 356.

Determining Element-to-Element Correspondence

Introduced here are editing platforms that can employ algorithms designed to compute pairwise element-to-element correspondence between two sets of graphical elements. As noted above, these sets of graphical elements may be part of a single graphic, or these sets of graphical elements may be part of separate graphics. As further discussed below, these algorithms may employ a graph kernel to programmatically and algorithmically compute the similarity between the two sets of graphical elements.

At a high level, an editing platform can obtain a first set of graphical elements $S=\{s_0, s_1, \ldots, s_n\}$ and a second set of graphical elements $T=\{t_0, t_1, \ldots, t_n\}$ and then output the best corresponding element in the first set of graphical elements (S) for each graphical element in the second set of graphical elements (T). The first set of graphical elements may be referred to as the "source set of graphical elements," and the second set of graphical elements may be referred to as the "target set of graphical elements."

Figure 4:
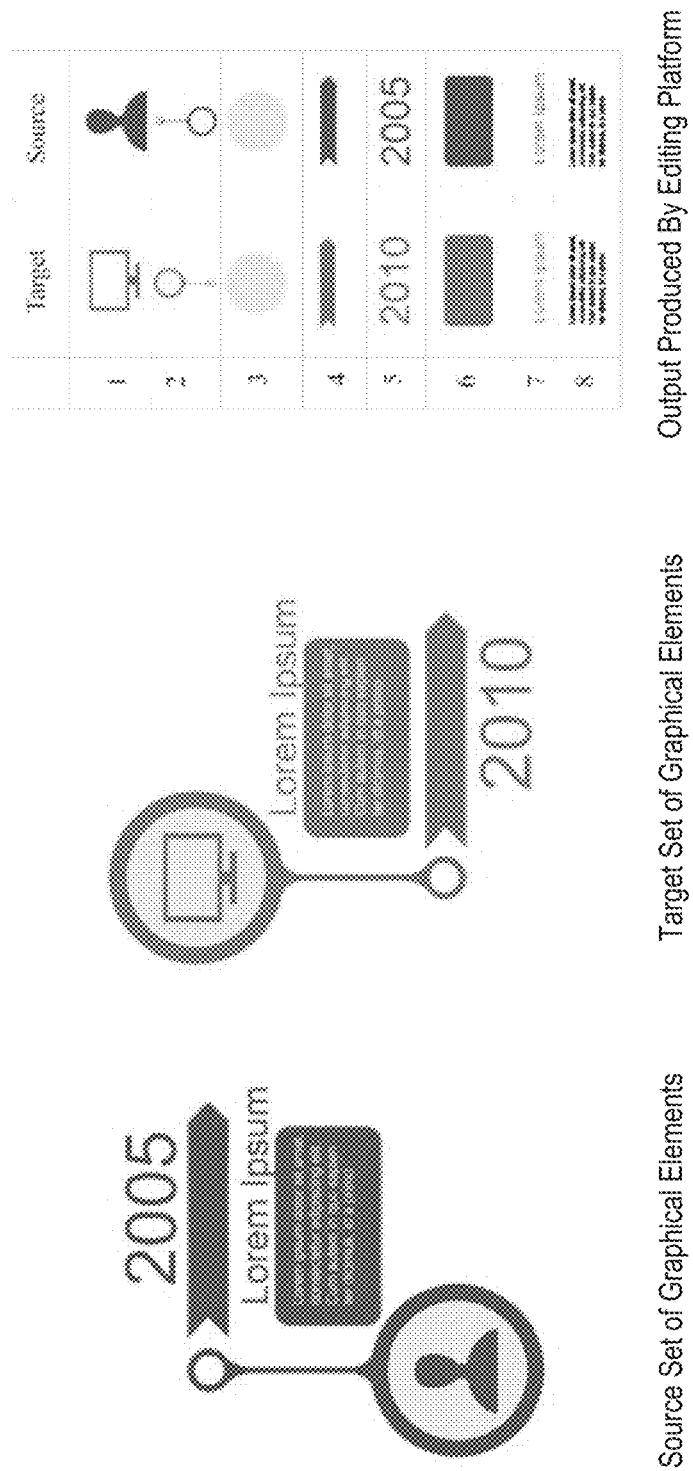
FIG. 4 depicts an example of a correspondence relationship determined by an editing platform for two sets of graphical elements (i.e., a source set and a target set).

Initially, the editing platform can construct relationship graphs ($G_S$, $G_T$) for the first set of graphical elements (S) and the second set of graphical elements (T). In each relationship graph, the nodes may represent the graphical elements in the corresponding set while the edges may represent the relationships between those graphical elements. As further discussed below, the editing platform may programmatically and algorithmically determine the correspondence relationship between the first and second sets of graphical elements (S, T) based on a comparison of the relationship graphs ($G_S$, $G_T$). FIG. 4 depicts an example of a correspondence relationship determined by an editing platform for two sets of graphical elements (i.e., a source set and a target set).

In some embodiments, the editing platform encodes hierarchical relationships, geometric relationships (also referred to as "layout relationships"), and appearance relationships that are frequently observed and highly discriminatory. Examples of such relationships are provided in Table I. Some relationships tend to be stronger than others. For instance, parent-child relationships, containment relationships, and z-order relationships tend be stronger indicators of correspondence than alignment relationships and adjacency relationships.

TABLE I

Examples of relationships between graphical elements.

| Relationship Type | Examples |
| --- | --- |
| Hierarchical | Parent-Child |
| Layout | Containment, Z-Order, Alignment, Adjacency |
| Appearance | Color, Transparency |

As shown in Table I, examples of relationships include:
Parent-Child Relationships: In graphics, graphical elements that are frequently grouped together may form a parent-child relationship. A graphical element may be considered a child of each graphical element in its enclosing group, and a group may be considered a parent of all graphical elements that are members of the group.

Containment Relationships: Graphical Element A can be said to contain Graphical Element B if the bounding box of Graphical Element B is inside the bounding box of Graphical Element A. If Graphical Element A contains Graphical Element B and vice versa, these graphical elements can be said to overlay one another.

Z-Order Relationships: The z-order is the order of overlapping graphical elements that form a set. A first set of graphical elements can be said to have the same z-order as a second set of graphical elements if the graphical elements in each set are arranged in the same order.

Alignment Relationships: Similar to containment relationships, alignment relationships can be determined based on the bounding boxes of the graphical elements. The editing platform may compute horizontal alignments (e.g., left, center, and right) and/or vertical alignments (e.g., top, bottom, and middle) for a pair of graphical elements based on the corresponding bounding boxes.

Adjacency Relationships: Adjacency relationships can also be established based on the bounding boxes of the graphical elements. Graphical Element A can be classified as left of Graphical Element B if its bounding box is strictly on the left side of Graphical Element B's bounding box. For each direction (e.g., left, right, above, and below), the editing platform may encode a single geometrically closest adjacency relationship. For example, the arrow element may be encoded as being above the "Lorem Ipsum" text element in FIG. 4, but the editing platform may not encode that the arrow element is also above the longer text element.

By constructing the relationship graphs, the editing platform can establish a node set and an edge set for each set of graphical elements. One goal of the editing platform is to compare the relationship graphs so that for each node in the relationship graph corresponding to the second set of graphical elements, a closest corresponding node is identified in the relationship graph corresponding to the first set of graphical elements. To accomplish this, the editing platform may define a node kernel and an edge kernel. Collectively, these kernels may be referred to as the "graph kernel."

A. Computing the Node Kernel

First, the editing platform can define the node kernel ($k_{node}$) that compares a pair of nodes in the relationship graphs ($G_S$, $G_T$) and then outputs a similarity score. The node kernel can be defined such that it indicates similarity between the pair of graphical elements corresponding to the pair of nodes with respect to at least one metric. Examples of metrics include type, text content, shape, size, aspect ratio, border color, and fill color. Normally, the node kernel will include a separate kernel for each metric that independently produces a separate output. Accordingly, the node kernel may include a type kernel ($k_{type}$), a text kernel ($k_{text}$), a shape kernel ($k_{shape}$), and/or an aspect ratio kernel ($k_{ratio}$). In some embodiments, the node kernel is constructed such that its output is positive semi-definite and bounded between 0 and 1.

The type kernel ($k_{type}$) may be constructed to account for the degree of similarity in the types of graphical elements under examination. Each graphical element has a unique type, such as text, closed shape, or line. If the pair of graphical elements have the exact same type, then the type kernel may return a value of 1. If the pair of graphical elements are different but belong to the same category, then the type kernel may return a value of 0.5. For example, a pair of graphical elements may be different kinds of closed shapes (e.g., circles, rectangles, ellipses, polygons) or different kinds of lines (e.g., polylines, paths). If the pair of graphical elements are different types, then the type kernel may return a value of 0.1. Those skilled in the art will recognize that these values have been provided solely for the purpose of illustrating how the degree of similarity between graphical elements may affect the output of the type kernel. Different values may be output by the type kernel depending on its intended application (e.g., how sensitive the node kernel should be to variations in type).

The text kernel ($k_{text}$) may be constructed to account for the degree of similarity between the text of graphical elements under examination. Generally, the text kernel is designed to simply modify the value output by the type kernel. For example, if a pair of graphical elements are found to have the exact same text content, then the value output by the type kernel may be boosted by a certain factor (e.g., 2, 3, or 5). If the pair of graphical elements are found to have different text content, then the value output by the type kernel may be left unchanged.

Figure 5:
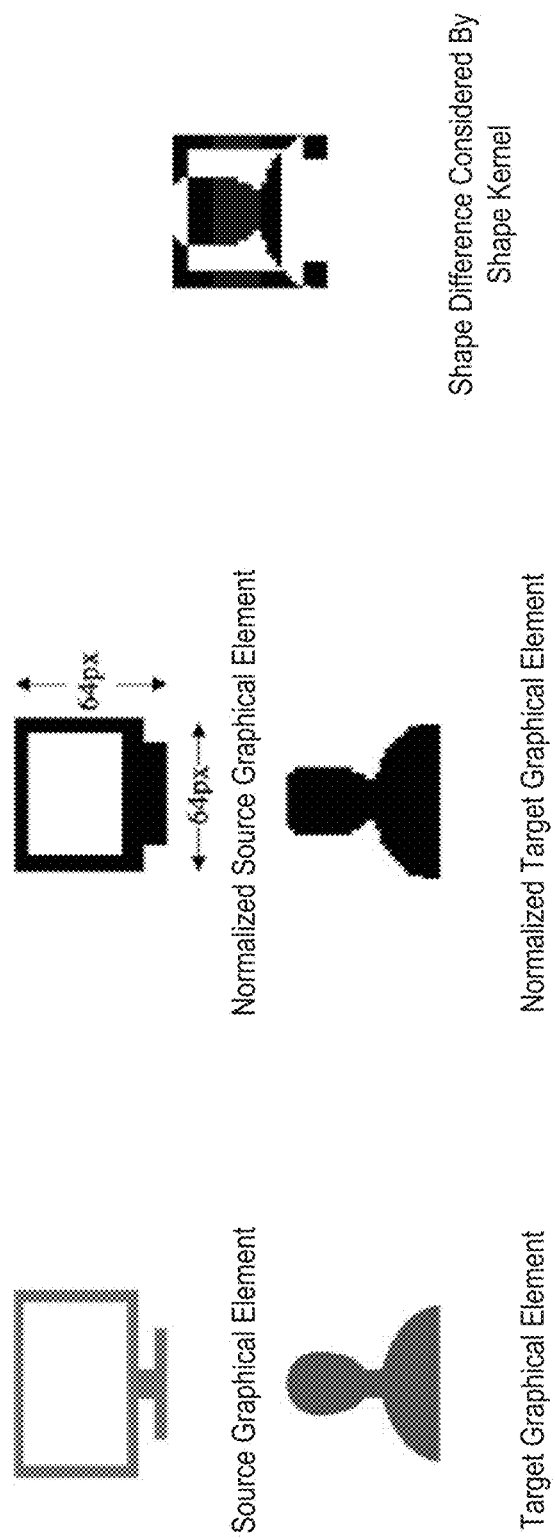
FIG. 5 illustrates how the shape kernel may normalize each graphical element into a square (e.g., 64-by-64) bitmap image by taking the alpha color values.

The shape kernel ($k_{shape}$) may be constructed to account for the degree of similarity in the shapes of graphical elements under examination. As shown in FIG. 5, the shape kernel may initially normalize each graphical element into a square (e.g., 64-by-64) bitmap image by taking the alpha color values. The difference between the graphical elements can then be estimated by computing the percentage difference on a per-pixel basis.

The aspect ratio kernel ($k_{ratio}$) may be constructed to account for the degree of similarity in the aspect ratios of the graphical elements under consideration. The output of the aspect ratio kernel may be representative of the compared aspect ratio of the graphical elements. In particular, the aspect ratio kernel can compare the aspect ratios of two graphical elements (s, t) by dividing the smaller aspect ratio by the larger aspect ratio as shown in Eq. 1.

$$k_{ratio}(s, t) = \frac{\min(s.width/s.height, t.widtj/t.height)}{\max(s.width/s.height, t.widtj/t.height)} \quad \text{Eq. 1}$$

The node kernel may be a weighted sum of these various kernels as shown in Eq. 2.

$$k_{node}(s,t) = \alpha_{type}(s)k_{type}(s,t)k_{text}(s,t) + \alpha_{shape}(s)k_{shape}(s,t) + \alpha_{ratio}(s)k_{ratio}(s,t), \quad \text{Eq. 2}$$

where $a_{type}(s)$, $\alpha_{shape}(s)$, and $\alpha_{ratio}(s)$ are weights defined based on the source graphical element (s). How these weights are computed is further discussed below.

B. Computing the Edge Kernel

Next, the editing platform can define the edge kernel ($k_{edge}$) that determines the similarity between a pair of edges that represent the relationship between two graphical elements. Each relationship may be represented as a different edge type so that the editing platform can distinguish between strong edges and weak edges. The term "strong edge" may refer to more discriminatory relationships such as hierarchical relationships, containment relationships, and z-order relationships, while the term "weak edge" may refer to less discriminatory relationships such as alignment relationships and adjacency relationships. The kernel between two edges (e, f) with types ($t_e$, $t_f$) can be defined as:

$$k_{edge}(e,f) = \alpha_{edge}\omega(t_e)\delta_{t_e t_f}, \quad \text{Eq. 3}$$

where $\omega(t_e)$ is a first value (e.g., 1) if $t_e$ is a strong edge and a second value (e.g., 0.2) otherwise. $\alpha_{edge}$ is a weight whose computation is further discussed below.

C. Computing the Similarity Score

Given the node kernel ($k_{node}$) and edge kernel ($k_{edge}$), the editing platform can compare a pair of directed graphs using a p-th order rooted walk graph kernel. A walk of length p on a directed graph is an ordered set of p nodes in the directed graph along with a set of p−1 edges that connect these nodes together. Generally, the editing platform will exclude any walks that contain a cycle from consideration.

Assume that $W_G^p(s)$ represents the set of all walks of length p starting at node s in directed graph $G_s$. Given nodes s and t in relationship graphs $G_s$ and $G_t$, respectively, the editing platform can define the p-th order rooted walk graph kernel as follows:

$$k_R^p(G_s, G_t, s, t) = \sum_{\substack{(s_1,e_1,\ldots,e_{p-1}s_p) \in W_{G_s}^p(s) \\ (t_1,f_1,\ldots,f_{p-1}t_p) \in W_{G_t}^p(t)}} k_{node}(s_p, t_p) \prod_{i=1}^{p-1} k_{edge}(e_i, f_i). \qquad \text{Eq. 4}$$

Figure 6:
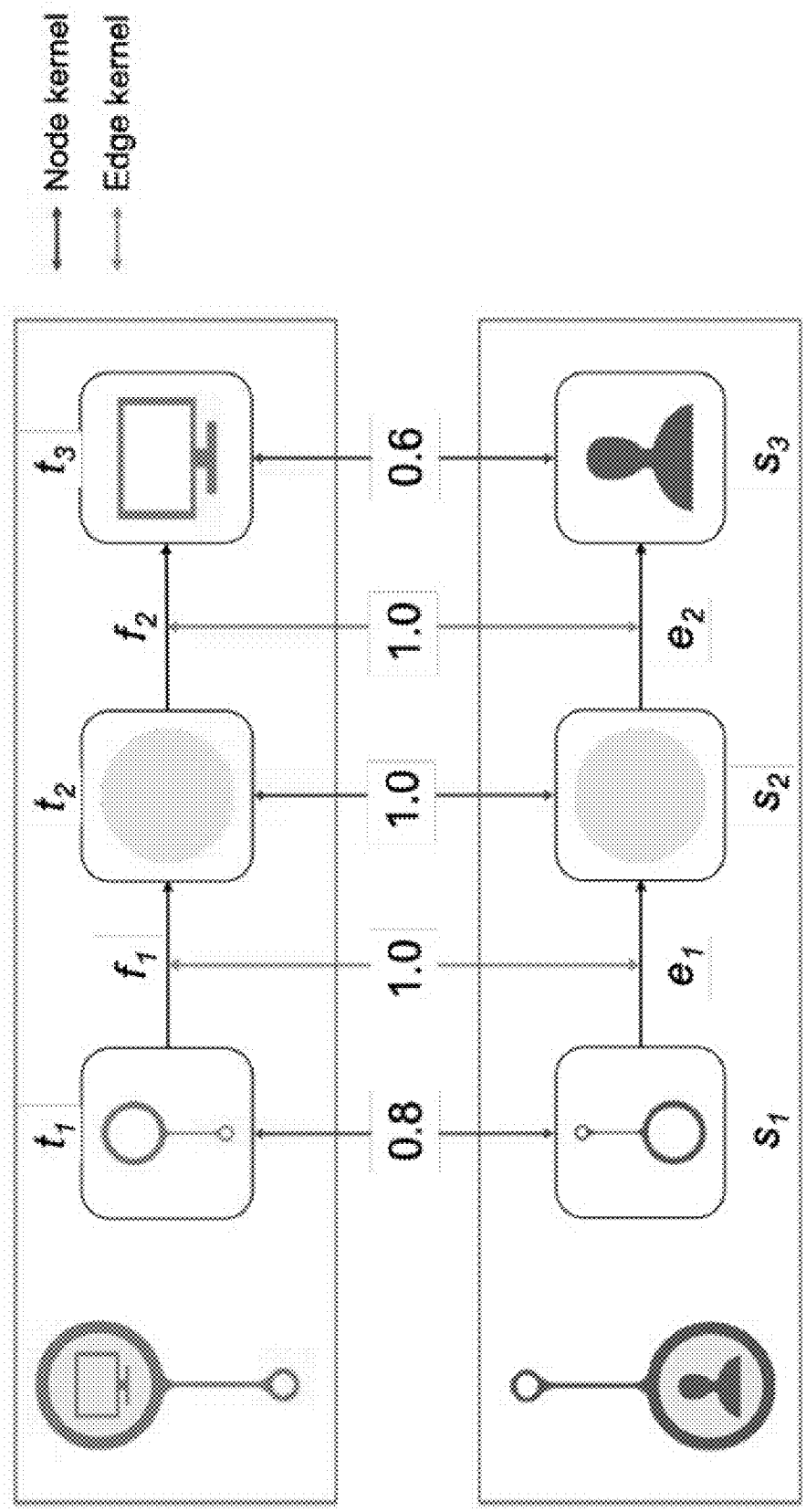
FIG. 6 illustrates how the similarity between a pair of walks can be computed by comparing the nodes and edges that comprise each walk using the node kernel and edge kernel, respectively.

This walk graph kernel compares nodes s and t by comparing all walks of length p whose first node is s against all walks of length p whose first node is t. FIG. 6 illustrates how the similarity between a pair of walks can be computed by comparing the nodes and edges that comprise each walk using the node kernel and edge kernel, respectively. In particular, FIG. 6 depicts a comparison of two walks of length 2. These two walks are compared by taking the product of the constituent node and edge kernels. Here, the similarity between these two walks is 0.8×1.0×1.0×1.0× 0.6=0.48. The result is a pairwise similarity score for all nodes in the relationship graphs ($G_S$, $G_T$) for the first set of graphical elements (S) and the second set of graphical elements (T).

D. Computing Weights

Given two sets of graphical elements (S, T) to be matched with one another, the editing platform may infer that these sets of graphical elements will be structurally similar. For instance, the editing platform may expect that corresponding graphical elements in these sets will share certain features if, for example, an individual has identified these sets as candidates for comparison. The weighting factors in Eq. 2-3 represent the importance of each feature in determining correspondence.

Assigning the appropriate weights can be difficult for several reasons, however. For instance, the editing platform may not know a priori which features are discriminatory and which are not. Moreover, assigning weights globally may not be an appropriate approach since the appropriate weights are highly dependent on the graphical elements being examined. Accordingly, the editing platform may assume that those features that are self-discriminatory within one set will also be discriminatory in comparison to another set. For example, 6 out of 8 graphical elements in the source set shown in FIG. 4 are red, so color is not a very discriminatory feature for these graphical elements. On the other hand, the circle element (i.e., the third entry in the output) has a unique color within the source set. For this graphical element, color is a highly discriminatory feature.

Using this approach, the editing platform can employ the concept of self-verification to determine a unique set of weights for each element in a set of graphical elements (S) as follows. For each graphical element $s_i \in s$, the editing platform can compare each feature with every other graphical element $s_j \in S$ and then compute how similar the feature values are. If the other graphical elements in S have similar feature values as s, the feature may not be considered discriminatory for s. However, if the feature value is unique to s, then the feature can be considered discriminatory for s. Generally, the weights are defined to lie between 0 (i.e., non-discriminatory) and 1 (i.e., highly discriminatory). As noted above, similarity may be determined based on one or more features. Examples of features include type, shape, color, aspect ratio, and edge type.

Type similarity ($\alpha_{type}$) between two graphical elements ($s_i$, $s_j$) can be computed using the type kernel described above. The discriminatory value of the type feature for a given graphical element ($s_i$) can be estimated by subtracting the average type similarity to s of all other graphical elements in S from 1, as shown below:

$$\alpha_{type}(s_i) = 1 - \frac{\sum_{s_j \in S, j \neq i} k_{type}(s_i, s_j)}{|S| - 1}, \qquad \text{Eq. 5}$$

where |S| is the number of graphical elements in S.

Shape similarity ($\alpha_{shape}$) can be computed by taking the average shape kernel between a given graphical element ($s_i$) and all other graphical elements in S and then subtracting from 1, as shown below:

$$\alpha_{shape}(s_i) = 1 - \frac{\sum_{s_j \in S, j \neq i} k_{shape}(s_i, s_j)}{|S| - 1}, \qquad \text{Eq. 6}$$

where |S| is the number of graphical elements in S.

Aspect ratio similarity ($\alpha_{ratio}$) can also be computed by taking the average of the aspect ratio kernels for the graphical elements and then subtracting from 1, as shown below:

$$\alpha_{ratio}(s_i) = 1 - \frac{\sum_{s_j \in S, j \neq i} k_{ratio}(s_i, s_j)}{|S| - 1}, \qquad \text{Eq. 7}$$

where |S| is the number of graphical elements in S.

Meanwhile, the weight for the edge kernel may be defined for each source graphical element ($s_i$) and for each edge type ($t_e$). Accordingly, if a given graphical element has many edges of the same type, then that type will be less discriminatory. In particular, edge type similarity ($\alpha_{edge}$) can be computed as follows:

$$\alpha_{edge}(s_i, t_e) = 1 - \frac{\#edges(s_i, t_e)}{\#edges(s_i)}, \qquad \text{Eq. 8}$$

where #edges($s_i$, $t_e$) is the number of edges of $s_i$ that are type $t_e$, and where #edges($s_i$) is the total number of edges of $s_i$.

E. Finding Pairwise Correspondence

A simple approach to finding correspondence between two sets of graphical elements (S, T) would be to match each graphical element (t) in a first set of graphical elements (T) with the graphical element (s) in the second set of graphical elements (S) that has the highest similarity score. However, this approach may be sensitive to small changes in the similarity score. Accordingly, the editing platform may take an iterative approach that distinguishes between confident matches and less-confident matches (also referred to as "uncertain matches") and then utilizes the confident matches to update the similarity scores of the uncertain matches.

The editing platform may attempt to find a matching source graphical element s∈S for every target graphical element t∈T. A graphical element $t_i \in T$ can be said to have a confident match with graphical element $s_j \in S$ if $$k_R^p(G_T, G_S, t_i, s_j) \gg k_R^p(G_T, G_S, t_i, s) \forall s \in S, s \neq s_j. \quad \text{Eq. 9}$$

That is, if the similarity score of $(t_i, s_j)$ is much greater than the similarity score of $t_i$ with any other graphical element in S (e.g., by a factor of 1.5, 2, 3, etc.), then the match may be deemed confident. Graphical elements in T for which confident matches have not been found may be deemed to have uncertain matches.

After the editing platform has identified the graphical elements in the first set of graphical elements (T) with confident matches, the editing platform can recompute the similarity scores using the same walk graph kernel shown in Eq. 4 but with updated node kernels ($k_{node}$) for target graphical elements ($t_i$) with confident matches:

$$k_{node}(t_i, s_i) = \begin{cases} 5 & \text{if } t_i \text{ has confident match with } s_j, \\ 0 & \text{otherwise} \end{cases} \quad \text{Eq. 10}$$

Those skilled in the art will recognize that the constant (here, 5) could be a different value, though the editing platform generally assigns a fairly high similarity score (e.g., higher than 2 or 3). Similarity scores for target graphical elements with uncertain matches can be recomputed using the original node kernels as shown in Eq. 2.

In some embodiments, the editing platform iteratively performs the steps of identifying confident matches and then recomputing similarity scores until all target graphical elements are confidently matched to a single source graphical element. In other embodiments, the editing platform iteratively performs the steps of identifying confident matches and then recomputing similarity scores until a threshold number of iterations is reached. In such embodiments, after the threshold number of iterations is reached, the editing platform may match each remaining target graphical element with the most similar source graphical element using the most recently computed similarity scores.

Evidence of Algorithmic Approaches to Computing Correspondence

These algorithmic approaches to computing correspondence have been tested on a variety of different graphics including charts, infographic designs, and UI designs. These graphics were created by applying different variations to a source graphic. Examples of variations include adding duplicate graphical elements, removing graphical elements, applying layout changes such as reflection or rotation, and transforming the shape/size of graphical elements. As discussed above, the algorithmic approach employed by the editing platform can be designed to handle these variations in design.

Figure 7:
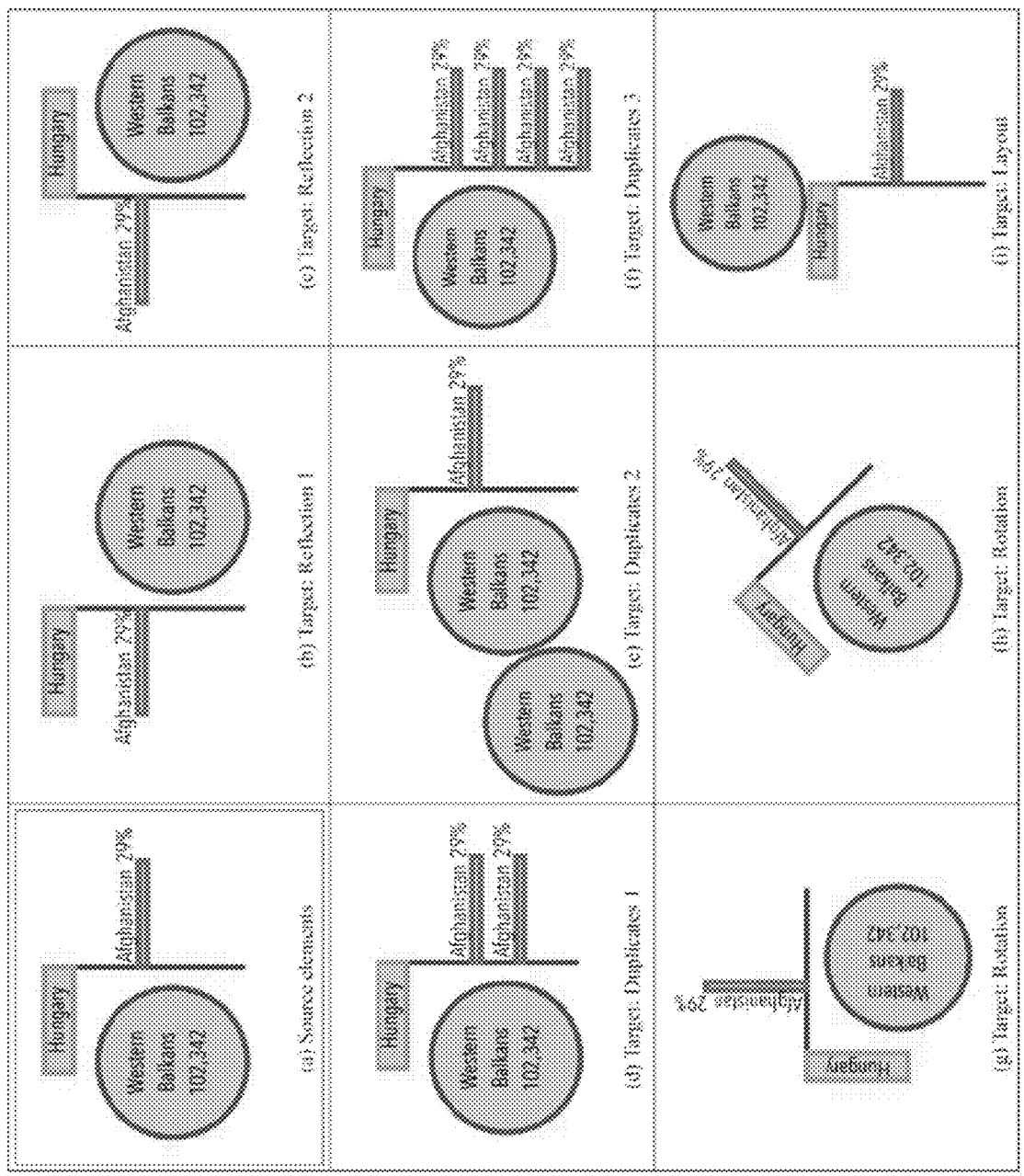
FIG. 7 depicts the matching results produced by the editing platform for different variations of a graphic.

FIG. 7 depicts the matching results produced by the editing platform for different variations of a graphic. In FIG. 7, the source graphic is shown on the upper left while the target graphics represent different variations of the source graphic. Correspondence between the source graphic and each target graphic is indicated by the boundary colors.

Figure 8:
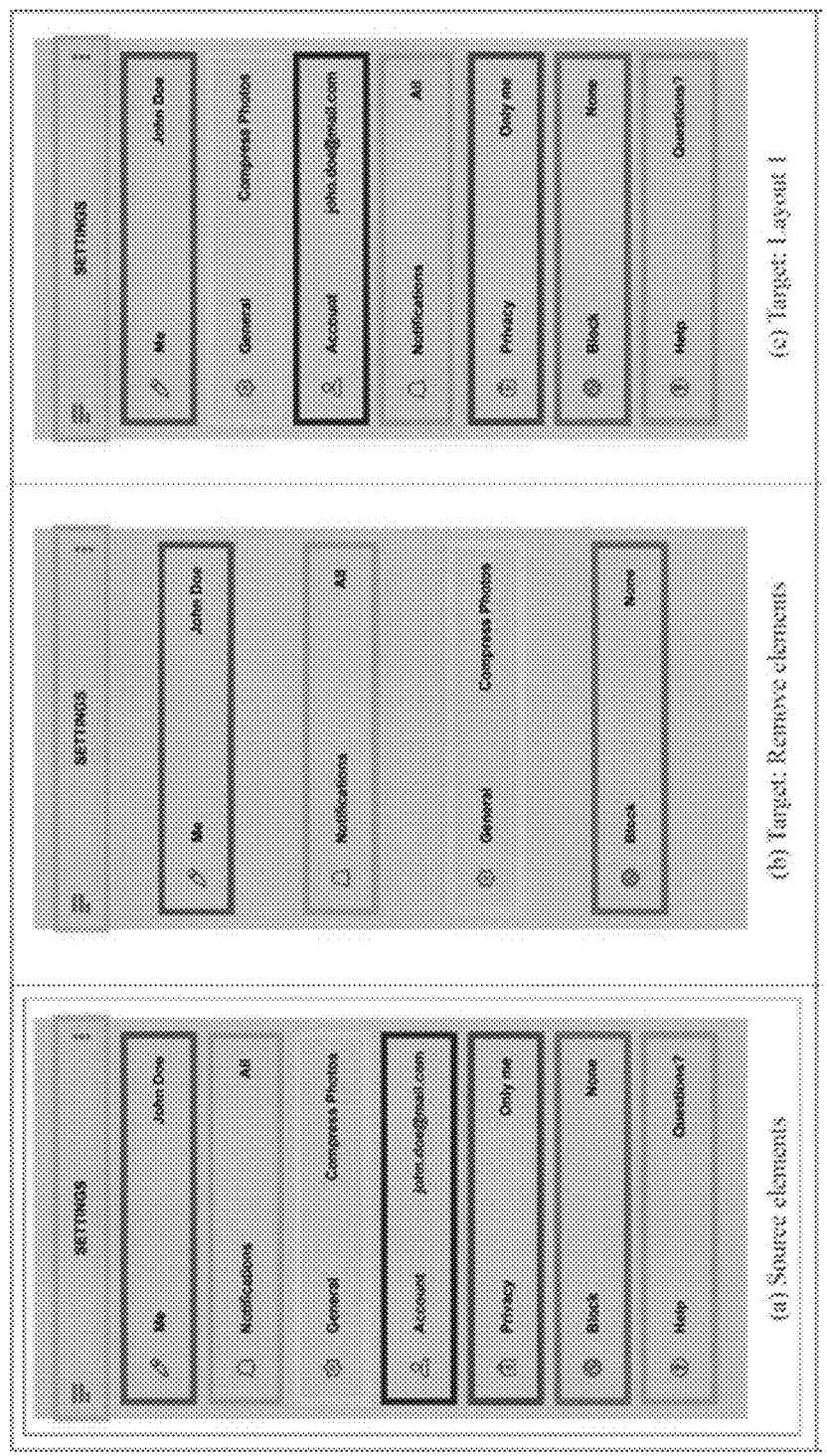
FIG. 8 depicts the matching results produced by the editing platform for different variations of a menu.

FIG. 8 depicts the matching results produced by the editing platform for different variations of a menu. The source menu is shown on the left while the target menus represent different variations of the source menu. As can be seen in FIG. 8, the editing platform is able to account for variations in the layout, shape, and presence of graphical elements. For example, the editing platform can discover correspondence even if some graphical elements are missing from the target menu. As another example, the editing platform can discover correspondence even if some or all of the graphical elements have a different shape or position.

In some embodiments, the matching algorithms employed by the editing platform are designed to take into account other types of relationships between graphical elements. For example, utility of color is a strong signal for grouping in many graphics. Relative text sizes may also encode sufficient information about the roles played by text-based graphical elements in a graphic. These relationships can be added to the relationship graphs as new edge types. Similarly, the editing platform may readily incorporate more features into computation of the node kernel, such as the size of the graphical element, the bounding box orientation, the border color of the graphical element, or the fill color of the graphical element.

Figure 9:
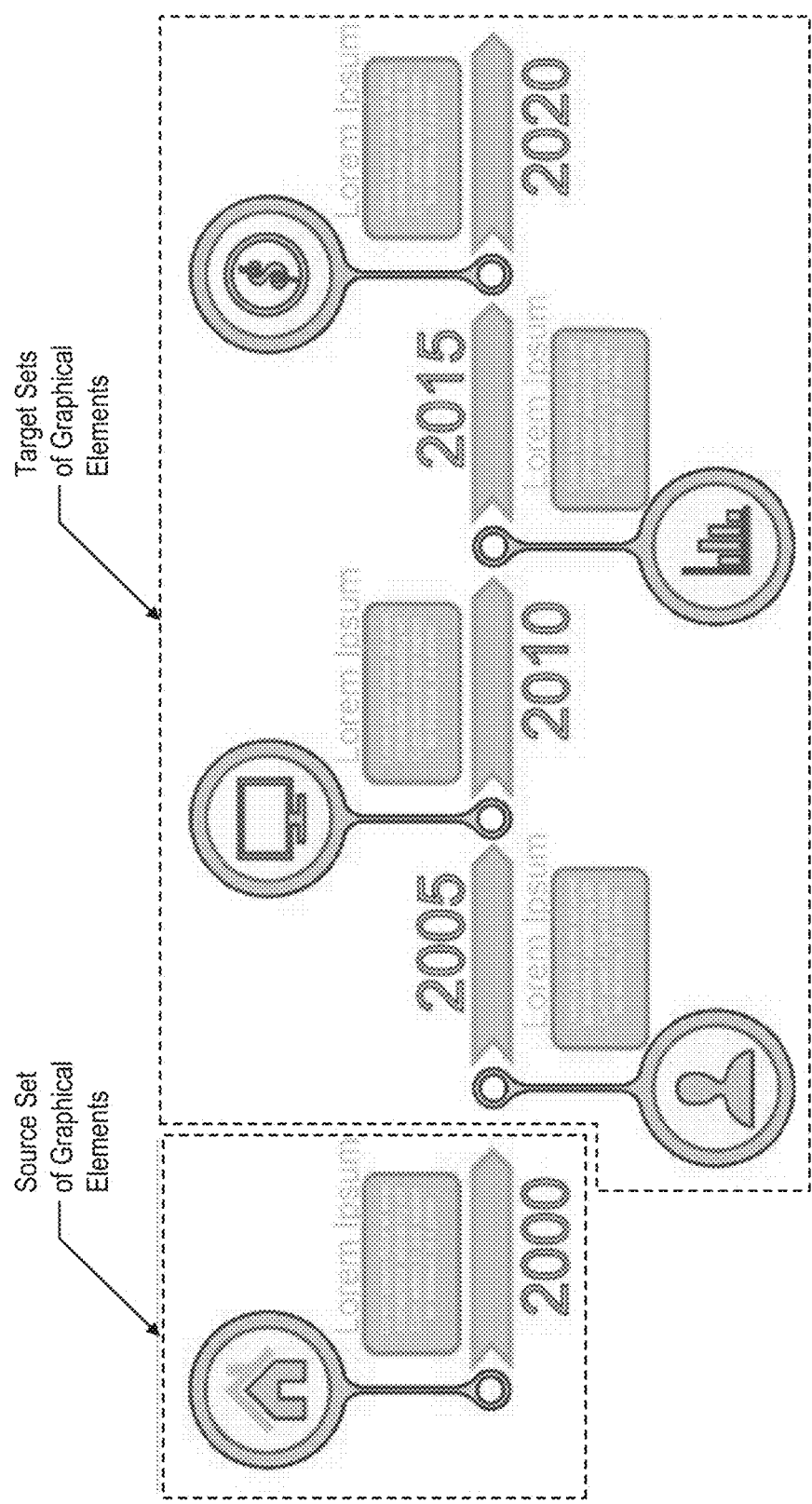
FIG. 9 depicts the matching results produced by the editing platform configured to simultaneously match a source set of graphical elements against multiple target sets of graphical elements.

As noted above, the editing platform may be configured to apply the matching algorithm against multiple sets of graphical elements in the same graphic. In such a scenario, the editing platform may match the source set of graphical elements against the target sets of graphical elements either simultaneously or sequentially. FIG. 9 depicts the matching results produced by the editing platform configured to simultaneously match a source set of graphical elements against multiple target sets of graphical elements.

Methodologies for Algorithmically Finding Correspondence

As discussed above, an editing platform may employ one or more algorithms designed to compute pairwise element-to-element correspondence between two sets of graphical elements. While several processes are described below in the context of comparing two sets of graphical elements, those skilled in the art will recognize that these processes may be employed—simultaneously or sequentially—to compare more than two sets of graphical elements. For instance, a source set of graphical elements may be simultaneously compared to multiple targets sets of graphical elements.

Figure 10:
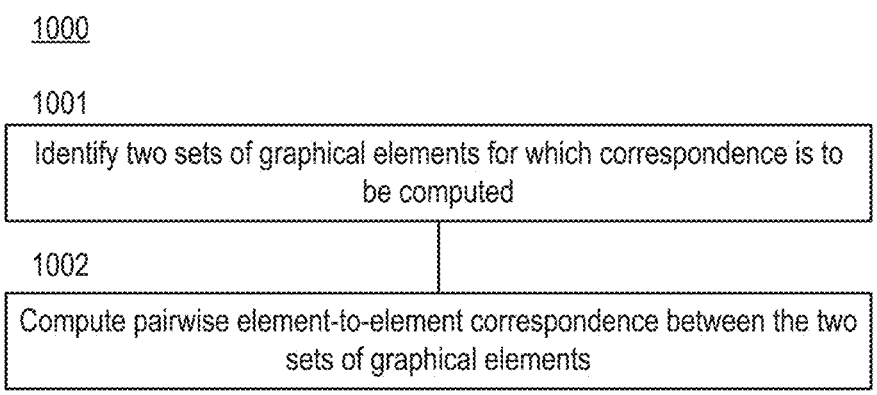
FIG. 10 depicts a flow diagram of a process for algorithmically determining the correspondence relationship between graphical elements.

FIG. 10 depicts a flow diagram of a process 1000 for algorithmically determining the correspondence relationship based on the similarity between two pairs of graphical elements. Initially, an editing platform can identify two sets of graphical elements for which correspondence is to be computed (step 1001). For instance, the editing platform can obtain a first set of graphical elements $S = \{s_0, s_1, \ldots, s_n\}$ and a second set of graphical elements $T = \{t_0, t_1, \ldots, t_n\}$. While embodiments may be described in the context of a source set of graphical elements being the first set of graphical elements and a target set of graphical elements being the second set of graphical elements, this relationship may be reversed unless specified otherwise. For instance, the graphical elements in a target set may be matched to the graphical elements in a source set or vice versa.

In some embodiments, the first set of graphical elements and/or the second set of graphical elements are manually identified by an individual via an interface generated by the editing platform. For example, the individual may identify (e.g., via clicking and dragging) the graphical elements that comprise the first and second sets. As another example, the individual may identify the graphical elements that comprise the first set, and the editing platform may automatically identify the graphical elements that comprise the second set (e.g., based on visual similarity, programmatic similarity, or an established relationship such as inclusion within a group).

As noted above, the first and second sets of graphical elements may be part of the same vector graphic or different vector graphics.

Then, the editing platform can compute pairwise element-to-element correspondence between the first and second sets of graphical elements (step 1002). For example, the editing platform may generate similarity scores that indicate the best corresponding graphical element in the first set of graphical elements for each graphical element in the second set of graphical elements, as further discussed below with respect to FIGS. 11-13.

Establishing the correspondence relationship between the first and second sets of graphical elements may be useful in several respects. For instance, assume that an individual wishes to define a macro of editing operations on the first set of graphical elements that are viewable and/or editable through an interface generated by the editing platform and then apply the macro to the second set of graphical elements. Traditionally, the individual would have needed to explicitly specify the relationship between the first and second sets of graphical elements. By employing the approach described herein, however, the editing platform can leverage information inferred about each graphical element in the first set to generalize the macro, and thus infer which editing operation applies to which graphical element in the second set. For example, if the editing platform receives input indicative of editing action that has been (or will be) applied to the first set of graphical elements, the editing platform may determine, based on the correspondence between the first and second series of graphical elements, an applicable editorial action available to be performed on the second set of graphical elements. The key to applying the macro defined from the first set of graphical elements to the second set of graphical elements is to find the element-to-element correspondence. After correspondence has been computed by employing the process described above, the editing platform can apply the editing operation applied to each graphical element in the first set to its corresponding graphical element in the second set. Each editing operation can be interpreted as an absolute operation (e.g., set the size of a graphical element to a given height and width) or as a relative operation (e.g., change the size by a given factor).

Figure 11:
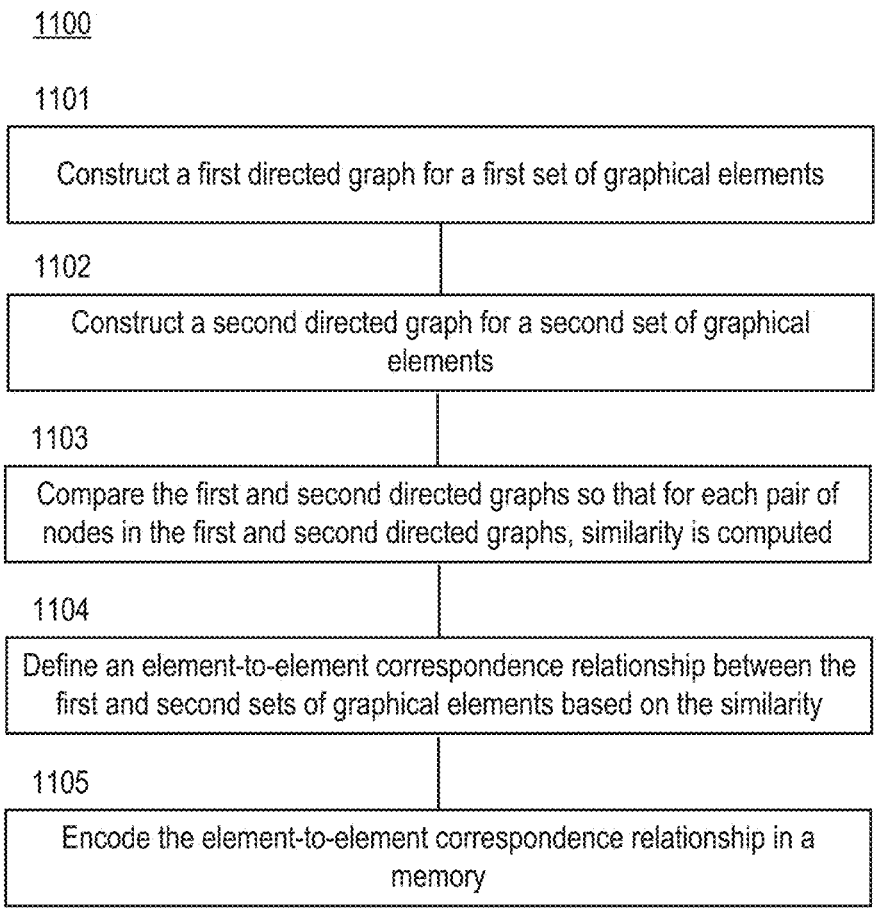
FIG. 11 depicts a flow diagram of a process for representing the first and second sets of graphical elements as directed graphs.

FIG. 11 depicts a flow diagram of a process 1100 for representing the first and second sets of graphical elements as directed graphs. In a directed graph, a set of nodes (also referred to as "objects" or "vertices") are connected by edges that are directed from one node to another. Representing the first and second sets of graphical elements as directed graphs may be a key aspect of computing the correspondence between those graphical elements.

Initially, the editing platform can construct a first directed graph for the first set of graphical elements (step 1101). Nodes in the first directed graph may represent the first set of graphical elements, and edges in the first directed graph may represent the relationships between those graphical elements in the first set. Similarly, the editing platform can construct a second directed graph for the second set of graphical elements (step 1102). Nodes in the second directed graph may represent the second set of graphical elements, and edges in the second directed graph may represent the relationships between those graphical elements in the second set.

Then, the editing platform can compare the first and second directed graphs so that for each pair of nodes in the first and second directed graphs, similarity is computed (step 1103). As further described below with respect to FIGS. 12-13, such action may require that the editing platform encode a relationship of the graphical elements in the first set (or the second set) discovered through an analysis of the first directed graph (or second directed graph). Accordingly, the editing platform may define an element-to-element correspondence relationship between the first and second sets of graphical elements based on the similarity (step 1104). Said another way, the editing platform can determine, based on the similarity between the graphical elements in the first and second sets of graphical elements, the correspondence between a first graphic comprised of the first set of graphical elements and a second graphic comprised of the second set of graphical elements can be computed. As noted above, this is accomplished by matching each node in the second directed graph with a single node in the first directed graph based on the similarity scores. The element-to-element correspondence relationship can be encoded in a memory for future use (step 1105). For instance, a data structure (e.g., a table) could be populated with information that specifies the relationship, on a per-element basis, between the first and second sets of graphical elements. As further discussed below, the element-to-element correspondence relationship can be used to discover, for example, how editing operations applied to one set of graphical elements can be automatically applied to another set of graphical elements.

In some instances, each node in the second directed graph will have the highest similarity score with a single node in the first directed graph. However, in other instances, a single node (say, $t_0$) in the second directed graph may have the highest similarity score for several nodes (say, $s_0$ and $s_1$) in the first directed graph. In such a scenario, the editing platform may identify both pairs (i.e., $[t_0, s_0]$ and $[t_0, s_1]$) as being comprised of similar graphical elements. Accordingly, the editing platform may create the following list of pairs: $[t_0, s_0]$, $[t_0, s_1]$, $[t_3, s_2]$, $[t_4, s_3]$, etc. As further discussed below with respect to FIG. 13, the editing platform can address this scenario by recomputing similarity to establish the most confidence match for each node in the second directed graph.

The correspondence relationship can be useful in several respects. For example, the editing platform may be able to determine whether editorial action(s) should be applied to the second set of graphical elements to mimic editorial action(s) that have been applied to the first set of graphical elements. Examples of editorial actions include changes in layout, appearance, etc. As another example, upon receiving input indicative of a query that specifies the first set of graphical elements, the editing platform may provide the second set of graphical elements due to its similarity to the first set of graphical elements. As shown in FIGS. 7-9, each graphical element in the first set may not necessarily be related to a corresponding graphical element in the second set (and vice versa). In FIG. 8, for example, the source set includes some graphical elements that do not appear in any of the target sets for which correspondence has been computed.

Figure 12:
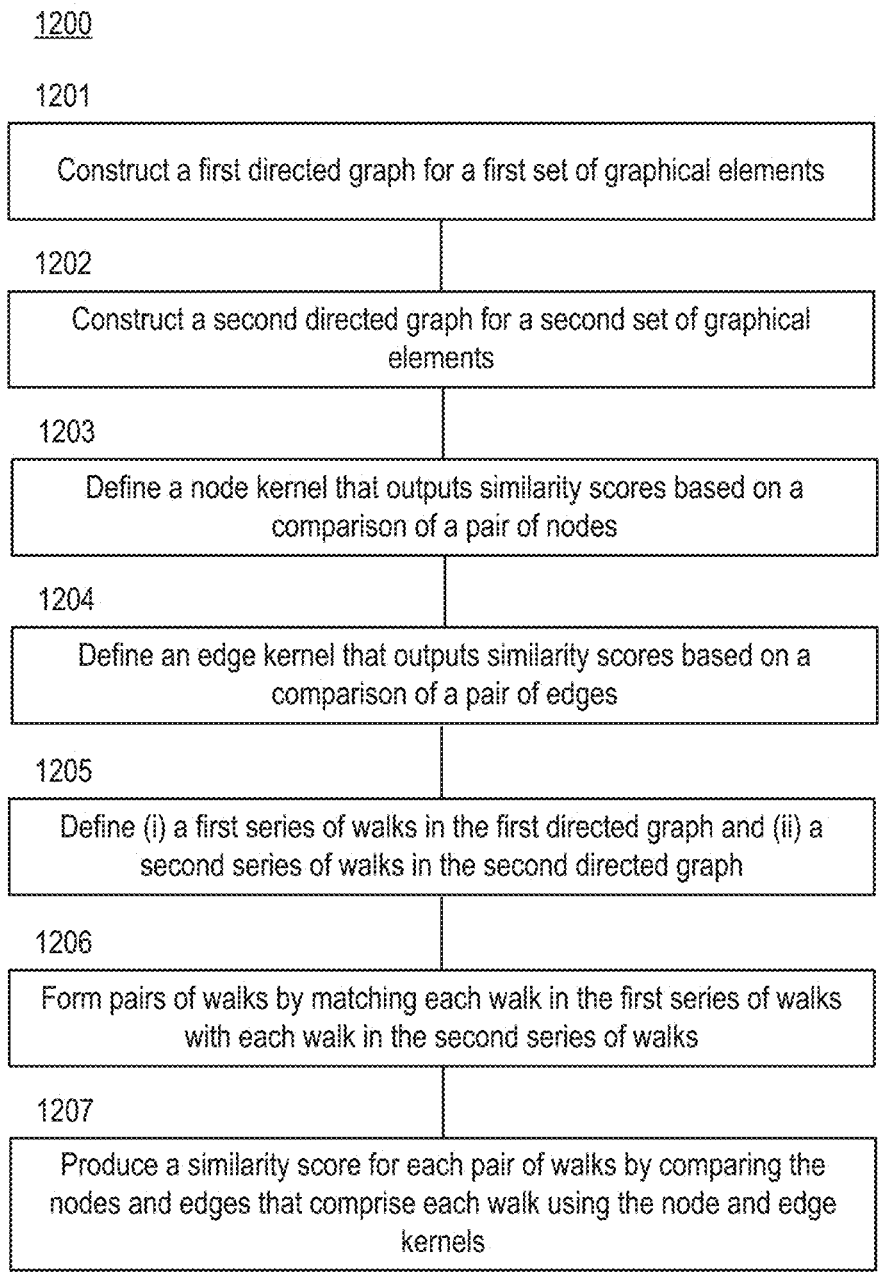
FIG. 12 depicts a flow diagram of a process for programmatically computing the correspondence between a first and second set of graphical elements.

FIG. 12 depicts a flow diagram of a process 1200 for programmatically computing the correspondence between a first and second set of graphical elements. Steps 1201-1202 of FIG. 12 may be substantially similar to steps 1101-1102 of FIG. 11.

After constructing the first and second directed graphs, the editing platform can define a node kernel that compares a pair of nodes corresponding to a pair of graphical elements and then outputs a similarity score (step 1203). The node kernel can be defined such that it indicates similarity between the pair of graphical elements with respect to at least one metric. Examples of metrics include type, text content, shape, and aspect ratio. Normally, the node kernel will include a separate kernel for each metric that independently produces a separate output. Accordingly, the node kernel may include a type kernel, a text kernel, a shape kernel, and/or an aspect ratio kernel as discussed above.

The editing platform can also define an edge kernel that outputs similarity scores indicative of the similarity between a pair of edges (step 1204). As noted above, each edge may represent a relationship between a pair of graphical elements in the same set. Each relationship may be represented as a different edge type so that the editing platform can distinguish between strong edges and weak edges.

The editing platform can define (i) a first series of walks in the first directed graph and (ii) a second series of walks in the second directed graph (step 1205). For a given directed graph, a walk of length p is an ordered set of p nodes in the directed graph along with a set of p−1 edges that connect these nodes together. Examples of walks having a length of 3 are shown in FIG. 5. Generally, the editing platform will exclude any walks that contain a cycle from consideration. Then, the editing platform can form pairs of walks by matching each walk in the first series of walks with each walk in the second series of walks (step 1206).

For each pair of walks, the editing platform can produce a similarity score by comparing the nodes and edges that comprise each walk using the node and edge kernels (step 1207). Collectively, the node and edge kernels may be referred to as the "graph kernel." The graph kernel may compare a pair of nodes (s, t) by comparing all walks of length p whose first node is s against all walks of length p whose first node is t. The result is a pairwise similarity score for all nodes in the first and second directed graphs.

FIG. 13 depicts a flow diagram of a process 1300 for distinguishing between confident matches and less-confident matches (also referred to as "uncertain matches") based on the similarity scores. Generally, the process 1300 of FIG. 13 will be performed following the process 1200 of FIG. 12. That is, the process 1300 of FIG. 13 may begin with obtaining a matrix of pairwise similarity scores for the nodes in two directed graphs corresponding to two sets of graphical elements.

Initially, the editing platform can classify all nodes in one directed graph as either confident matches or uncertain matches based on the pairwise similarity scores for nodes in another directed graph (step 1301). For example, a given node in the directed graph associated with a target set of graphical elements (also referred to as the "target directed graph") may be classified as a confident match if the pairwise similarity score corresponding to a single node in the directed graph associated with a source set of graphical elements (also referred to as the "source directed graph") exceeds a threshold. Similarly, the given node may be classified as an uncertain match if the pairwise similarity scores corresponding to all nodes in the source directed graph fall beneath the threshold. In other embodiments, a given node in the target directed graph is classified as a confident match if the pairwise similarity score corresponding to a single node in the source directed graph exceeds the pairwise similarity scores corresponding to all other nodes in the source directed graph by a certain factor (e.g., 1.5, 2, 3, or 5).

After the nodes in the target directed graph with confident matches have been identified, the editing platform can recompute the similarity scores. More specifically, the editing platform can recompute the pairwise similarity scores for nodes classified as confident matches with updated node kernel parameters (step 1302) as shown in Eq. 10. Meanwhile, the editing platform can recompute the pairwise similarity scores for nodes classified as uncertain matches with the original node kernel parameters (step 1303) as shown in Eq. 2.

As noted above, the editing platform may iteratively perform the process 1300 until all nodes in the target directed graph are confidently matched to a single node in the source directed graph (or vice versa). Alternatively, the editing platform may iteratively perform the process 1300 until a threshold number of iterations is reached. In such embodiments, after the threshold number of iterations is reached, the editing platform may match each remaining node in the target directed graph with the most similar node in the source directed graph using the most recently computed similarity scores.

Unless contrary to physical possibility, it is envisioned that the steps described above may be performed in various sequences and combinations. For example, the editing platform may simultaneously execute multiple instances of the process 1000 of FIG. 10 in order to compare one set of graphical elements (also referred to as a "source set of graphical elements") to multiple other sets of graphical elements (also referred to as "target sets of graphical elements").

Other steps may also be included in some embodiments. For example, the editing platform may receive input indicative of a macro of editing operations applied to the first set of graphical elements. In such instances, the editing platform may leverage the correspondence relationship by generalizing the macro to understand what changes, if any, should be made to the graphical elements in the second set. As another example, the editing platform may receive input indicative of a query that specifies a set of graphical elements (or a design with those graphical elements). In such instances, the editing platform may leverage the correspondence relationship to return one or more similar sets of graphical elements (or designs with similar sets of graphical elements) as a result. The result may be ordered in terms of similarity to the set of graphical elements specified in the query.

Computing System

Figure 14:
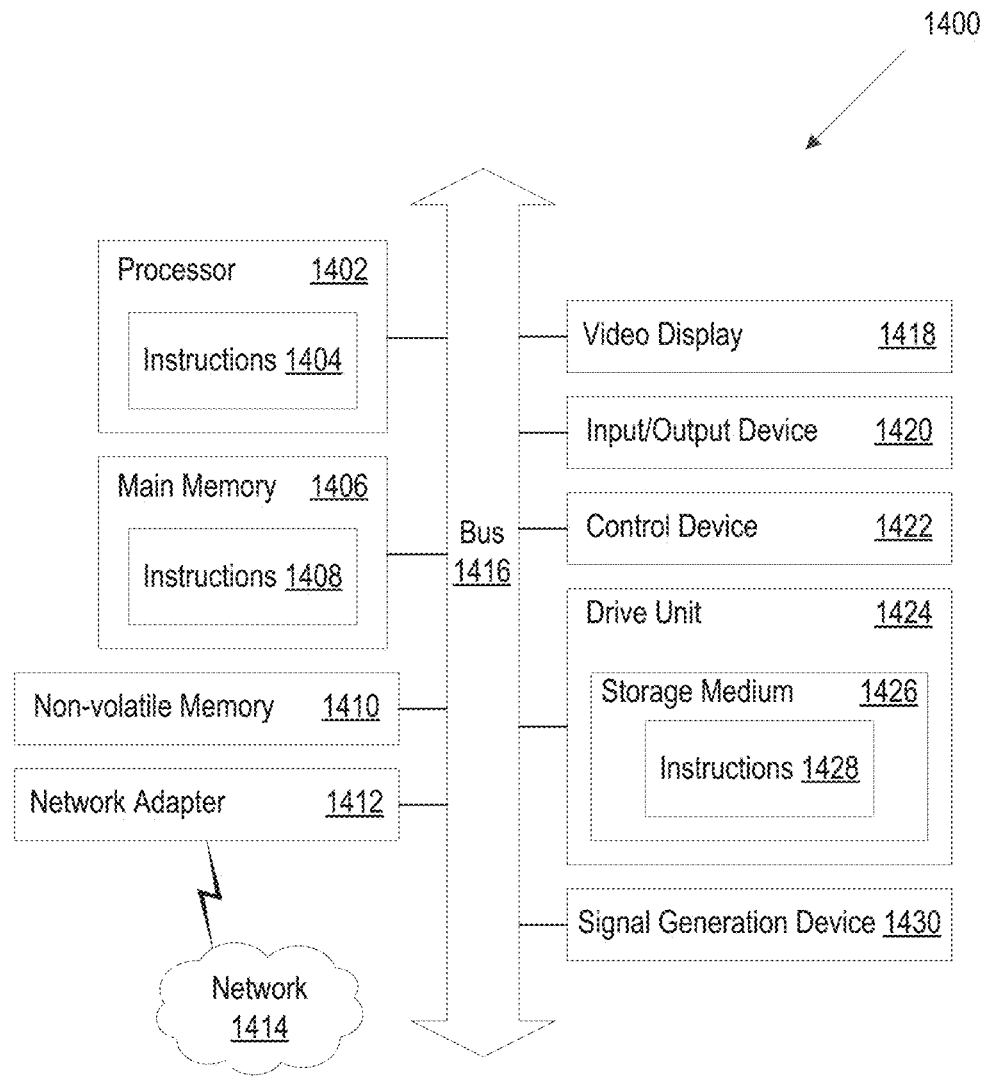
FIG. 14 is a block diagram illustrating an example of a computing system in which at least some operations described herein can be implemented.

FIG. 14 is a block diagram illustrating an example of a computing system 1400 in which at least some operations described herein can be implemented. For example, some components of the computing system 1400 may be hosted on a computing device that includes an editing platform (e.g., the editing platforms 302, 358 of FIGS. 3A-B).

The computing system 1400 may include one or more central processing units (also referred to as "processors") 1402, main memory 1406, non-volatile memory 1410, network adapter 1412 (e.g., network interface), video display 1418, input/output devices 1420, control device 1422 (e.g., keyboard and pointing devices), drive unit 1424 including a storage medium 1426, and signal generation device 1430 that are communicatively connected to a bus 1416. The bus 1416 is illustrated as an abstraction that represents one or more physical buses and/or point-to-point connections that are connected by appropriate bridges, adapters, or controllers. The bus 1416, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The computing system 1400 may share a similar computer processor architecture as that of a personal computer, tablet computer, mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the computing system 1400.

While the main memory 1406, non-volatile memory 1410, and storage medium 1426 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 1428. The term "machine-readable medium" and "storage medium" shall also be taken to include any medium that is capable of storing, encoding, or carrying a set of instructions for execution by the computing system 1400.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 1404, 1408, 1428) set at various times in various memory and storage devices in a computing device. When read and executed by the one or more processors 1402, the instruction(s) cause the computing system 1400 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 1410, floppy and other removable disks, hard disk drives, optical disks (e.g., Compact Disk Read-Only Memory (CD-ROMS), Digital Versatile Disks (DVDs)), and transmission-type media such as digital and analog communication links.

The network adapter 1412 enables the computing system 1400 to mediate data in a network 1414 with an entity that is external to the computing system 1400 through any communication protocol supported by the computing system 1400 and the external entity. The network adapter 1412 can include a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 1412 may include a firewall that governs and/or manages permission to access/proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A computer-implemented method comprising:
identifying, by at least one processor, (i) a first graphic comprised of a first series of graphical elements and (ii) a second graphic comprised of a second series of graphical elements;
constructing, by the at least one processor, a first directed graph for the first graphic,
wherein nodes in the first directed graph represent the first series of graphical elements, and
wherein edges in the first directed graph represent relationships between the first series of graphical elements;
constructing, by the at least one processor, a second directed graph for the second graphic,
wherein nodes in the second directed graph represent the second series of graphical elements, and wherein edges in the second directed graph represent relationships between the second series of graphical elements;

computing, by the at least one processor, pairwise element-to-element similarity between the first and second series of graphical elements by comparing the first and second directed graphs so that for each pair of nodes in the first and second directed graphs, similarity is computed;

determining, by the at least one processor based on the similarity between the first and second series of graphical elements, a correspondence relationship between the first and second graphics;

causing, by the at least one processor, the correspondence relationship to be encoded in a memory;

receiving input indicative of a macro of one or more editing operations that have been applied to the first series of graphical elements of the first graphic;

generalizing, by the at least one processor, the macro by utilizing the correspondence relationship to infer what changes, if any, should be made to the second series of graphical elements of the second graphic; and outputting, via a graphical user interface (GUI), information indicative of the correspondence relationship between the first and second graphics.

2. The computer-implemented method of claim 1, further comprising:

receiving a query for a set of graphical elements similar to the first series of graphical elements; and returning the second series of graphical elements in response to the query based on the correspondence relationship.

3. The computer-implemented method of claim 1, wherein said generalizing comprises:

determining, based on the correspondence relationship between the first and second graphics, an applicable editorial action available to be performed on the second series of graphical elements of the second graphic.

4. The computer-implemented method of claim 1, wherein the correspondence relationship between the first and second graphics changes when at least one graphical element in the first series of graphical elements differs from a corresponding graphical element in the second series of graphical elements in terms of orientation, position, size, color, or number.

5. A non-transitory computer-readable medium with instructions stored thereon that, when executed by a processor, cause the processor to perform operations comprising:

identifying (i) a first set of graphical elements representative of a first vector graphic and (ii) a second set of graphical elements representative of a second vector graphic;

computing pairwise element-to-element similarity between the first and second sets of graphical elements;

determining an element-to-element correspondence relationship between the first and second vector graphics based on the similarity between the first and second sets of graphical elements;

receiving input indicative of a macro of one or more editing operations that have been applied to the first set of graphical elements of the first vector graphic;

generalizing the macro by utilizing the element-to-element correspondence relationship to infer what changes, if any, should be made to the second set of graphical elements of the second vector graphic; and causing display of information regarding the element-to-element correspondence relationship between the first and second vector graphics on an interface.

6. The non-transitory computer-readable medium of claim 5, wherein computing pairwise element-to-element similarity between the first and second sets of graphical elements comprises:

constructing a first directed graph for the first set of graphical elements, constructing a second directed graph for the second set of graphical elements, and comparing the first and second directed graphs so that for each pair of nodes in the first and second directed graphs, similarity is computed.

7. The non-transitory computer-readable medium of claim 6, wherein nodes in the first and second directed graphs represent the graphical elements in the first and second sets, and wherein edges represent relationships between the graphical elements.

8. The non-transitory computer-readable medium of claim 6, wherein computing pairwise element-to-element similarity between the first and second sets of graphical elements further comprises:

encoding a first structural relationship of the first set of graphical elements based on an analysis of the nodes in the first directed graph, and encoding a second structural relationship of the second set of graphical elements based on an analysis of the nodes in the second directed graphs.

9. The non-transitory computer-readable medium of claim 8, wherein comparing the first and second directed graphs is based on the first and second structural relationships.

10. The non-transitory computer-readable medium of claim 8, wherein each structural relationship defines hierarchical relationships, geometric relationships, or appearance relationships between the graphical elements in the first and second sets of graphical elements.

11. The non-transitory computer-readable medium of claim 6, wherein comparing the first and second directed graphs comprises:

defining node kernels that output similarity scores based on comparisons of pairs of nodes, defining edge kernels that output similarity scores based on comparisons of pairs of edges, defining (i) a first series of walks in the first directed graph and (ii) a second series of walks in the second directed graph, wherein each walk represents an ordered set of n nodes along with n−1 edges that connect the n nodes together, forming pairs of walks by matching each walk in the first series of walks with each walk in the second series of walks, and producing a similarity score for each pair of walks by comparing the nodes and edges that compose each walk using the node and edge kernels.

12. The non-transitory computer-readable medium of claim 11, wherein each node kernel includes multiple sub-kernels that produce separate outputs for different metrics.

13. The non-transitory computer-readable medium of claim 12, wherein the different metrics include type, text content, shape, size, aspect ratio, border color, fill color, or any combination thereof.

14. The non-transitory computer-readable medium of claim 11, wherein the node kernels are defined to be positive semi-definite and bounded between 0 and 1.

15. The non-transitory computer-readable medium of claim 11, wherein producing the similarity score for each pair of walks results in pairwise similarity scores for all nodes in the first and second directed graphs.

16. The non-transitory computer-readable medium of claim 15, wherein comparing the first and second directed graphs further comprises:
computing, for each node in the first directed graph, correspondence with each node in the second directed graph based on the pairwise similarity scores.

17. The non-transitory computer-readable medium of claim 15, wherein comparing the first and second directed graphs further comprises:
classifying all nodes in the first directed graph as either confident matches or uncertain matches,
wherein a given node is classified as a confident match if the pairwise similarity score corresponding to a single node in the second directed graph is greater than all other pairwise similarity scores by a certain factor, and
wherein the given node is classified as an uncertain match if no pairwise similarity score is greater than all other pairwise similarity scores by the certain factor,
recomputing the pairwise similarity scores for nodes classified as uncertain matches with the node kernels, and
recomputing the pairwise similarity scores for nodes classified as confident matches with updated node kernels.

18. The non-transitory computer-readable medium of claim 17, wherein said classifying and said recomputing are iteratively performed until a predetermined number of iterations have been performed.

19. A computer-implemented method comprising:
constructing (i) a first directed graph for a first set of graphical elements and (ii) a second directed graph for a second set of graphical elements;
defining a graph kernel that includes—
a node kernel that outputs a similarity score based on a comparison of a pair of nodes, and
an edge kernel that outputs a similarity score based on a comparison of a pair of edges;
defining (i) a first series of walks in the first directed graph and (ii) a second series of walks in the second directed graph,
wherein each walk represents an ordered set of n nodes along with n−1 edges that connect the n nodes together;
forming pairs of walks by matching each walk in the first series of walks with each walk in the second series of walks;
producing a similarity score for each pair of walks by comparing the nodes and edges that compose each walk using the graph kernel;
determining a correspondence relationship between the first and second sets of graphical elements based on the similarity scores;
receiving input indicative of a macro of one or more editing operations that have been applied to the first set of graphical elements; and
generalizing the macro by utilizing the correspondence relationship to infer what changes, if any, should be made to the second set of graphical elements.

20. The computer-implemented method of claim 19, further comprising:
determining paired node relationships by computing similarity for each pair of nodes in the first and second directed graphs; and
determining the correspondence relationship between the first and second sets of graphical elements based on the paired node relationships.

\* \* \* \* \*